United States Patent [19]

Suzuki et al.

[11] Patent Number: 5,640,535
[45] Date of Patent: Jun. 17, 1997

[54] LIBRARY APPARATUS FOR DUPLICATING DISKS AND THEN SORTING THEM TO EASILY DISTINGUISH DEFECTIVE DISKS FROM NORMALLY COPIED DISKS

[75] Inventors: Hiroshi Suzuki; Satoshi Makita, both of Kawasaki, Japan

[73] Assignee: Fujitsu Limited, Kawasaki, Japan

[21] Appl. No.: 530,485

[22] Filed: Sep. 19, 1995

[30] Foreign Application Priority Data

Dec. 5, 1994 [JP] Japan .................. 6-300592

[51] Int. Cl.$^6$ .................................... G11B 5/84
[52] U.S. Cl. .................. 395/497.01; 364/478.11; 369/84; 369/34
[58] Field of Search ............ 369/84, 85, 30, 369/34, 36; 395/488, 489, 497.01; 364/478.11, 478.07

[56] References Cited

U.S. PATENT DOCUMENTS

| | | | |
|---|---|---|---|
| 4,494,156 | 1/1985 | Kadison et al. | 360/48 |
| 4,571,645 | 2/1986 | Johnson et al. | 360/99.03 |
| 4,646,178 | 2/1987 | Garratt et al. | 360/98.06 |
| 4,694,964 | 9/1987 | Ueberreiter | 209/549 |
| 4,727,509 | 2/1988 | Johnson et al. | 360/15 |
| 4,813,838 | 3/1989 | Santeusanio | 414/798.1 |
| 4,826,019 | 5/1989 | Kondo et al. | 209/538 |
| 4,835,702 | 5/1989 | Tanaka | 364/478.05 |
| 4,869,813 | 9/1989 | Bailey et al. | 209/538 |
| 4,910,675 | 3/1990 | Burns et al. | 364/478.11 |
| 5,019,929 | 5/1991 | Costas | 360/98.01 |
| 5,157,784 | 10/1992 | Nishiyama | 395/600 |
| 5,274,516 | 12/1993 | Kakuta et al. | 360/92 |
| 5,373,489 | 12/1994 | Sato et al. | 369/36 |
| 5,392,266 | 2/1995 | Kobayashi et al. | 369/36 |
| 5,532,888 | 7/1996 | Acosta et al. | 360/92 |
| 5,546,315 | 8/1996 | Kleinschnitz | 364/478.06 |
| 5,546,366 | 8/1996 | Dang | 369/36 |

FOREIGN PATENT DOCUMENTS

| | | |
|---|---|---|
| 535419 | 2/1993 | Japan . |
| 5210463 | 8/1993 | Japan . |

OTHER PUBLICATIONS

Kendall, Curt, "Cimarron User Experience," Mass Storage Systems, 1988 9th IEEE Symposium, pp. 93–97.

Bergstrom, Nils, "Automated Module Fabrication," Electro/94 Int'l. Conference Proceedings, Combined Volumes, pp. 863–875. May/1994.

News Release from Applied Data Communication: "High-Speed Disk Duplicator Produces Accurate Disk Copies—But Occupies Small Footprint", IAC Prompt (R) Database, Jul. 31, 1986, p. 11. Jul. 1986.

*Primary Examiner*—Tod R. Swann
*Assistant Examiner*—Keith W. Saunders
*Attorney, Agent, or Firm*—Greer, Burns & Crain, Ltd.

[57] ABSTRACT

A first determination unit determines whether or not the number of storage racks which stores each of a plurality of disks into which informations stored in one copying source disk are copied exceeds the number of the plurality of disks. A copying unit copies the informations stored in the copying source disk into each of the disks in order and determines whether or not a copying process is normal, when it is determined that the number of the storage racks exceeds the number of the plurality of disks. A storage control unit controls the disks so as to store the disks from one edge side of the storage rack in order when the copying process is normal, and controls the disks so as to store the disks from other edge side of the storage racks in order when the copying process is not normal. In another embodiment, duplication ceases when the number of copied disks totals one less than the number of storage racks. The extra storage rack visually denotes the dividing point between normally copied disks and defective disks.

24 Claims, 19 Drawing Sheets

LIBRARY APPARATUS FOR DUPLICATING DISKS AND THEN SORTING THEM TO EASILY DISTINGUISH DEFECTIVE DISKS FROM NORMALLY COPIED DISKS

BACKGROUND OF THE INVENTION

The present invention relates to a library device for copying information from a copying source disk to each of a plurality of disks of library construction, and selecting each of the copied disks. The present invention also relates to a method for selecting copied disks by the library device.

A magneto-optical disk device is connected to a personal computer and so on, and has been used like a hard disk. The magneto-optical disk device has been used as all kinds of computer storage units from large-sized to small-sized due to its bulk, compatibility and high reliability.

In recent years, the magneto-optical disk device has been used for storing a plurality of magneto-optical disks of library construction. The magnet-optical disk device of library construction has been used as a server for a Local Area Network (LAN) system and also as a storage device for CAD (Computer Aided Design) / CAM (Computer Aided Manufacturing), since the magneto-optical disk device has a capacity ranging from a few Giga Bytes (GB) to scores of Giga Bytes per device.

Further, the magneto-optical disk device is very useful as a copying machine when the identical information is stored in each of the magnet-optic disks of library construction from a few sheets to about hundreds of sheets. Namely, the magneto-optical disk device has not been merely used as a storage unit, but also it has been used as a copying machine.

In the above-mentioned magneto-optical disk device of library construction, a storage unit stores a predetermined number of sheets of magneto-optical disks to be copied in corresponding storage racks. A disk moving unit takes out the magneto-optical disks from each of the storage racks, and inserts them into a drive unit.

Then, the personal computer copies informations from one sheet of a copying source magneto-optical disk, which was prepared previously to each of the magneto-optical disks that were inserted into the drive unit. Then, each of the copied magneto-optical disks is returned to the corresponding storage rack by the disk moving unit. In this case, there will not be any problems in particular if the information is copied correctly.

However, the device can not easily discriminate a disk in which a copying error has occurred, if the copying error (a copying process was completed abnormally) occurred when the information was copied into the large number of sheets of magneto-optical disks. Namely, there were not any methods for discriminating the magneto-optical disk in which the copying error has occurred, even though each of the magnet-optical disks into which the information are copied was stored in the corresponding storage rack.

For this reason, an error would occur if some processes were executed later by using the information stored in a magneto-optical disk having a copying error. As a result, the reliability of information processing is deteriorated.

SUMMARY OF THE INVENTION

An object of the present invention is to provide a library device which is capable of easily discriminating a disk in which a copying error has occurred and executing a large quantity of copies rapidly, and a method for selecting copied disks by the library device.

The library device of the present invention comprises a plurality of storage racks, a first determination unit, a copying unit and a storage control unit. The storage racks store a plurality of disks into which information stored in one copying source disk are copied.

The first determination unit determines whether or not the number of the storage racks exceeds the number of the plurality of disks. The copying unit copies the information stored in the copying source disk into each of the disks in order and determines whether or not a copying process is normal, when it is determined by the first determination unit that the number of the storage racks exceeds the number of the plurality of disks.

The storage control unit controls the disks so as to store the disks from one side of the storage racks in order when the copying process by the copying unit is normal, and controls the disks so as to store the disks from other side of the storage racks in order when the copying process is not normal.

The present invention may also include the following additional components.

The number of the storage racks is one more than the number of the plurality of disks. Further, the library device of the present invention also can be provided with a drive unit for driving each of the disks, the copying source disks and the copying unit and a disk moving unit for moving each of the disks in order to the drive unit when each of the disks is copied, and for moving each of the disks to the edge side of the storage racks corresponding to a control signal indicating one of normality and abnormality of the copying process outputted from the storage control unit after each of the disks was copied.

The storage control unit may control the disks so as to take out the disks from the one side of the storage racks as the next disk to be copied and processed when the copying process is normal, and controls the disks so as to take out the disks from the other side of the storage racks as the next disk to be copied when the copying process is not normal.

Further, the library device of the present invention can be provided with a counting unit for counting the total number of copied disks and the number of error disks where the copying process is not normal, a second determination unit for determining whether or not number of the error disks counted by the counting unit has exceeded a predetermined number and an alarm unit for sounding an alarm when the number of error disks has exceeded the predetermined number.

The predetermined number of the error disks may be half of the total of the copied disks. Further, the library device can be provided with a display unit for displaying the number of error disks where the copying process is not normal on a screen.

The display unit displays on the screen a plurality of storage rack positions corresponding to the number of storage racks, and after the copying step has been completed, said display unit also displays a vacant storage rack indicator in one of said storage rack positions corresponding to a vacant storage rack such that the storage rack positions on one side of said vacant storage rack indicator represent the normal disks and the storage rack positions on the other side of said vacant storage rack indicator represent the error disks.

The storage control unit controls the disks so as to store the disks in a predetermined position of the storage racks when the copying process is normal, and controls the disks so as to store the disks in a position that is linearly shifted from the predetermined position when the copying process is not normal.

A method for selecting copied disks of the present invention comprises a determination step, a copying step and a storage control step.

The determination step determines whether or not the number of storage racks exceeds the number of a plurality of disks into which information stored in one copying source disk are copied. The copying step copies the information stored in the copying source disk into each of the disks in order and determines whether or not the copying process is normal, when it is determined that the number of the storage racks exceeds the number of the plurality of disks. The storage control step controls the disks so as to store the disks from the storage racks of one side in order when the copying process is normal, and controls the disks so as to store the disks from the storage racks of other side in order when the copying process is not normal.

The present invention may also include the following additional processes.

The number of the storage racks is one more than the number of the plurality of disks. Further, the method for selecting copied disks comprises a driving step for driving each of the disks, the copying source disks and the copying unit by drive unit and a disk moving step for moving each of the disks to the drive unit in order when each of the disks is copied, and moving each of the disks to the storage racks of the edge side corresponding to the control signal indicating one of normality and abnormality of the copying process after each of the disks is copied.

The storage control step controls the disks so as to take out the disks from the one side of the storage racks as next disks to be copied and processed when the copying process is normal, and controls the disks so as to take out the disks from the other side of the storage rack as the next disks to be copied when the copying process is not normal.

Further, the method for selecting copied disks comprises a counting step for counting the total number of copied disks and the number of error disks where the copying process is not normal, a determination step for determining whether or not the number of the counted error disks exceeds a predetermined number and an alarm step for sounding an alarm when the number of error disks exceeds the predetermined number.

The predetermined number of error disks is half of the total of the copied disks. Further, the method for selecting copied disks is provided with a display step for displaying the number of error disks where the copying process is not normal on the screen.

The display step displays a plurality of storage rack screens corresponding to the number of storage racks on the screen after the copying process of each disk was completed, and identifies and displays more than one storage rack screen corresponding to the difference number of the number of storage racks and the number of the plurality of disks for the storage rack screens corresponding to the number of error disks and the storage rack screens corresponding to the number of normal disks existing on both sides of the more than one storage rack screens.

The storage control step controls the disks so as to store the disks in a predetermined position when the copying process is normal, and controls the disks so as to store the disks in a position where a predetermined volume is shifted from the predetermined position of the storage racks when the copying process is not normal.

Further, the library device of the present invention comprises storage racks for storing a plurality of disks, a copying unit for copying information into each of the disks, a drive unit for driving each of the disks and the copying unit and moving means for moving the disks between the drive unit and the storage racks.

A method for producing a duplicated disk includes the three steps of providing a library apparatus, inserting the master disk into the reproducing unit, and controlling the library apparatus to produce a duplicated disk. The library apparatus includes a plurality of storage cells each of which stores a disk being recordable with information, a reproducing unit which reproduces master information stored in a master disk, a writing unit which writes the master information into the recordable disk, and an accessor which moves the recordable disk being recordable between one of the plurality of storage cells and the writing unit.

According to the present invention, first of all, the first determination unit determines whether or not the number of storage racks exceeds the number of disks. The copying unit copies the information stored in the copying source disk into each of the disks in order and determines whether or not the copying process is normal, when it is determined by the first determination unit that the number of the storage racks exceeds the number of the plurality of disks. Further, the storage control unit controls the disks so as to store the disks from one side of the storage racks in order, when the copying process is normal.

On the other hand, the storage control unit controls the disks so as to store the disks from other side of the storage racks in order when the copying process is not normal.

Namely, vacant storage racks are generated between the normal disks stored from one side of the storage racks and the error disks stored from other side, since the number of the plurality of copied disks is less than the number of the storage racks. Accordingly, an operator can easily discriminate between the normal disks and the error disks by identifying the vacant storage rack.

In addition, it will be possible to use a plurality of storage racks efficiently, if the number of the storage racks is set so that it will be one more than the number of the plurality of disks.

It is possible to store the disks by discriminating the normal disk from the error disks, since the disks moving unit moves each of the disks to the drive unit in order when each of the disks is copied, and moves each of the disks to the side of the storage rack corresponding to the control signal outputted from the storage control unit after the disk is copied.

Besides, the storage control unit controls the disks so as to take out the disks from the one side of the storage racks as the next disk to be copied and processed when the copying process is normal, and controls the disks so as to take out the disks from the other side of the storage racks when the copying process is not normal. In particular, when the number of storage racks is set so that it will be one more than the number the disks, the disks may all be stored in the storage rack, even if error disks are generated continuously.

The number of error disks whose copying process was not normal is counted, and it is determined whether or not the number of error disks counted exceeds the predetermined number. The operator can easily recognize that there are too many error disks, since an alarm is sounded when the number of error disks exceeds the predetermined number.

Moreover, it can be easily understood that the number of error disks exceeds the number of normal disks, when the predetermined number is half of the number of the copied disks and the number of the error disks exceeds the predetermined number.

Further, the operator can be alerted of the number of error disks by reading the display of the number of error disks whose copying process is not normal from the screen.

A display showing representations of the storage racks and the number of error and normal disks may be displayed on a screen.

The display may show a vacant storage rack indicator with representations of normal disks positioned on one side and representations of error disks on the other side. Accordingly, the operator can be made aware of the number of error disks and the number of normal disks.

The normal disks can be discriminated, since the disks are controlled so that the disks will be stored in a position where a predetermined volume is shifted from the predetermined position of the storage racks, when the copying process is not normal.

Besides, a plurality of disks are stored in the storage racks, and the disks are moved from the storage rack to the drive unit by moving unit. The drive unit drives each of the disks and the copying unit. The copying unit copies the information into each of the disks, and the moving means moves each of the disks from the drive unit to the storage racks. Accordingly, the disks can be copied rapidly and in large quantities.

DETAILED DESCRIPTION OF THE PREFERRED EMBODIMENT

Figure 1:
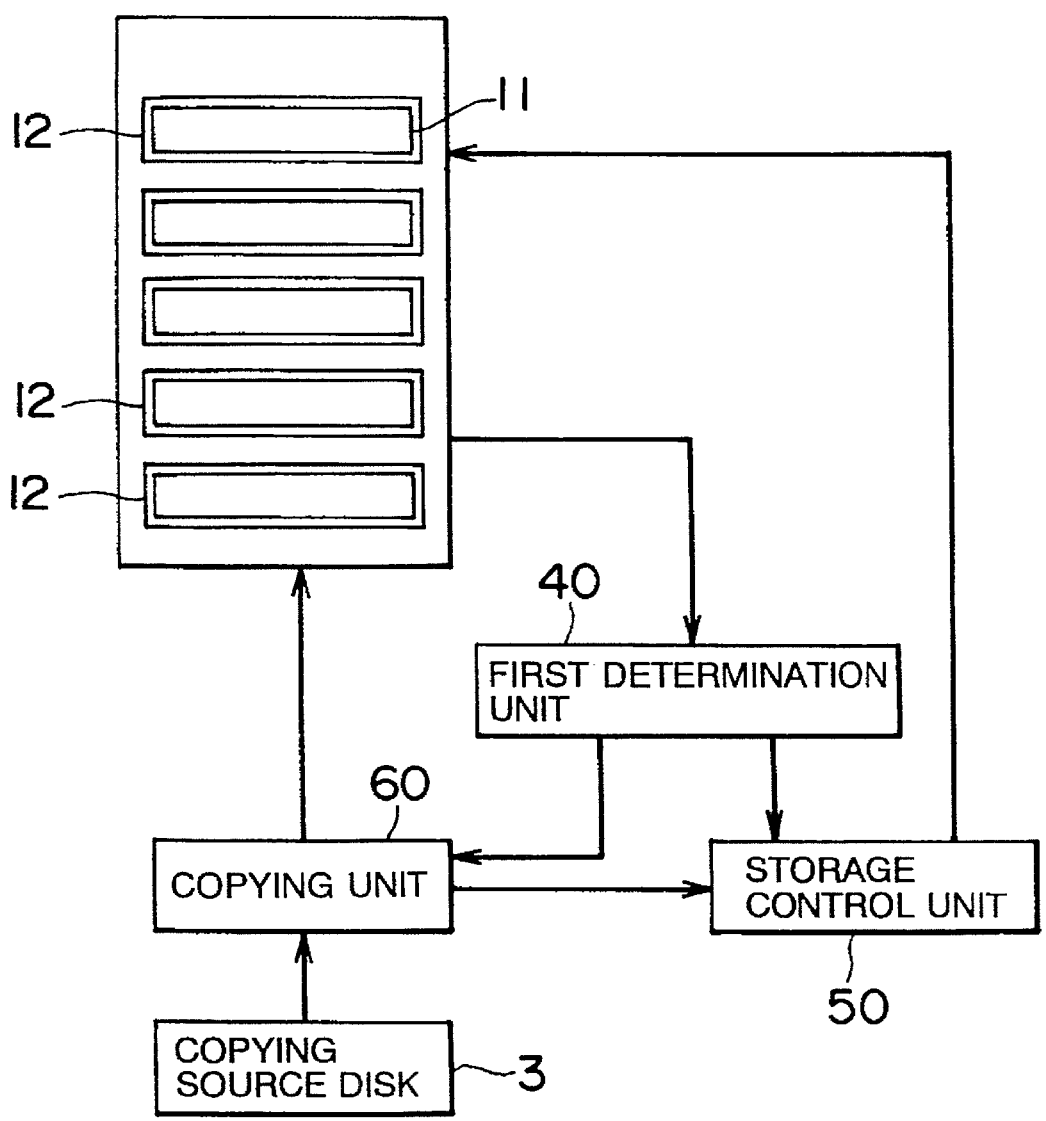
FIG. 1 is a construction diagram indicating a library device in accordance with an embodiment 1 of the present invention.

The embodiments of a method for selecting copied disks according to a library device and the library device of the present invention will be described by referring to the drawings as follows.

<EMBODIMENT 1>

FIG. 1 is a construction diagram indicating the library device in accordance with embodiment 1 of the present invention. The library device of the present invention comprises a plurality of storage racks 12, a first determination unit 40, a copying unit 60 connected to a copying source disk 3 and a storage control unit 50 connected to the copying unit 60 and the first determination unit 40.

The storage racks 12 are installed on the library device, and store each of a plurality of disks 11 into which information stored in one copying source disk 3 is copied. The plurality of disks 11 and the copying source disk 3 may be magneto-optical disks, floppy disks, hard disks, or other similar information storage devices.

The first determination unit 40 determines whether or not the number of the storage racks 12 exceeds the number of disks 11, and the first determination unit 40 is a function which is realized when an unillustrated central processing unit executes programs stored in a memory.

The copying means 60 copies the information stored in the copying source disk 3 into each of the disks 11 in order and determines whether or not the copying process is normal, where it is determined by the first determination unit 40 whether the number of storage racks 12 exceeds the number of disks 11. The copying unit 60 is a function which is realized when a central processing unit executes programs stored in a memory.

The storage control unit 50 controls the disks 11 so as to store the disks from one side of the storage racks 12 when the copying process by the copying unit 60 is normal, and controls the disks so as to store the disks from the other side of the storage racks 12 in order when the copying process is not normal. The storage control unit 50 is a function which is realized when a central processing unit executes programs stored in a memory.

Figure 2:
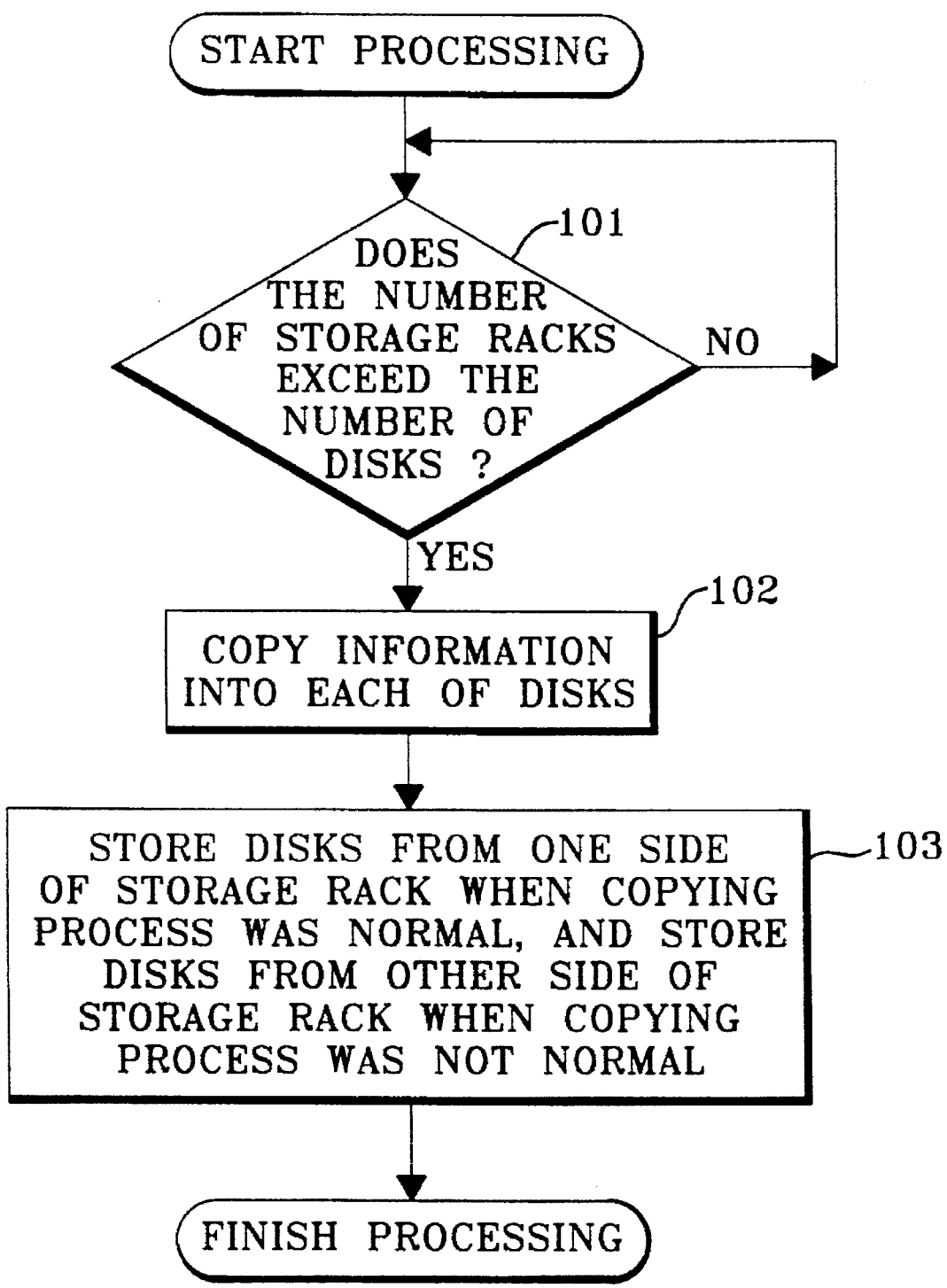
FIG. 2 is a flowchart indicating a method for selecting copied disks in accordance with embodiment 1 of the present invention.

Then, the method for selecting copied disks of the present invention will be described by referring to FIG. 2. As shown in FIG. 2, the first determination unit 40 determines whether or not the number of the storage racks 12 exceeds the number of disks 11 into which the information stored in one copying source disk 3 are copied (Step 101).

Then, the copying unit 60 copies the information stored in the copying source disk 3 into each of the disks 1 and determines whether or not the copying process is normal, where it is determined whether the number of storage racks 12 exceeds the number of plurality of disks 11 (Step 102).

Further, the storage control unit 50 controls the disks 11 so as to store the disks from one side of the storage rack 12 in order when the copying process is normal, and controls the disks so as to store the disks from the other side of the storage rack 12 in order when the copying process is not normal (Step 103).

Namely, a vacant storage rack is generated between the normal disks stored from one side of the storage racks 12 and the error disks stored from other side of the storage racks 12, since the number of copied disks 11 is less than the number of storage racks 12. Accordingly, the operator can easily discriminate between the normal disks and the error disks by identifying the vacant storage racks 12.

<EMBODIMENT 2>

Figure 3:
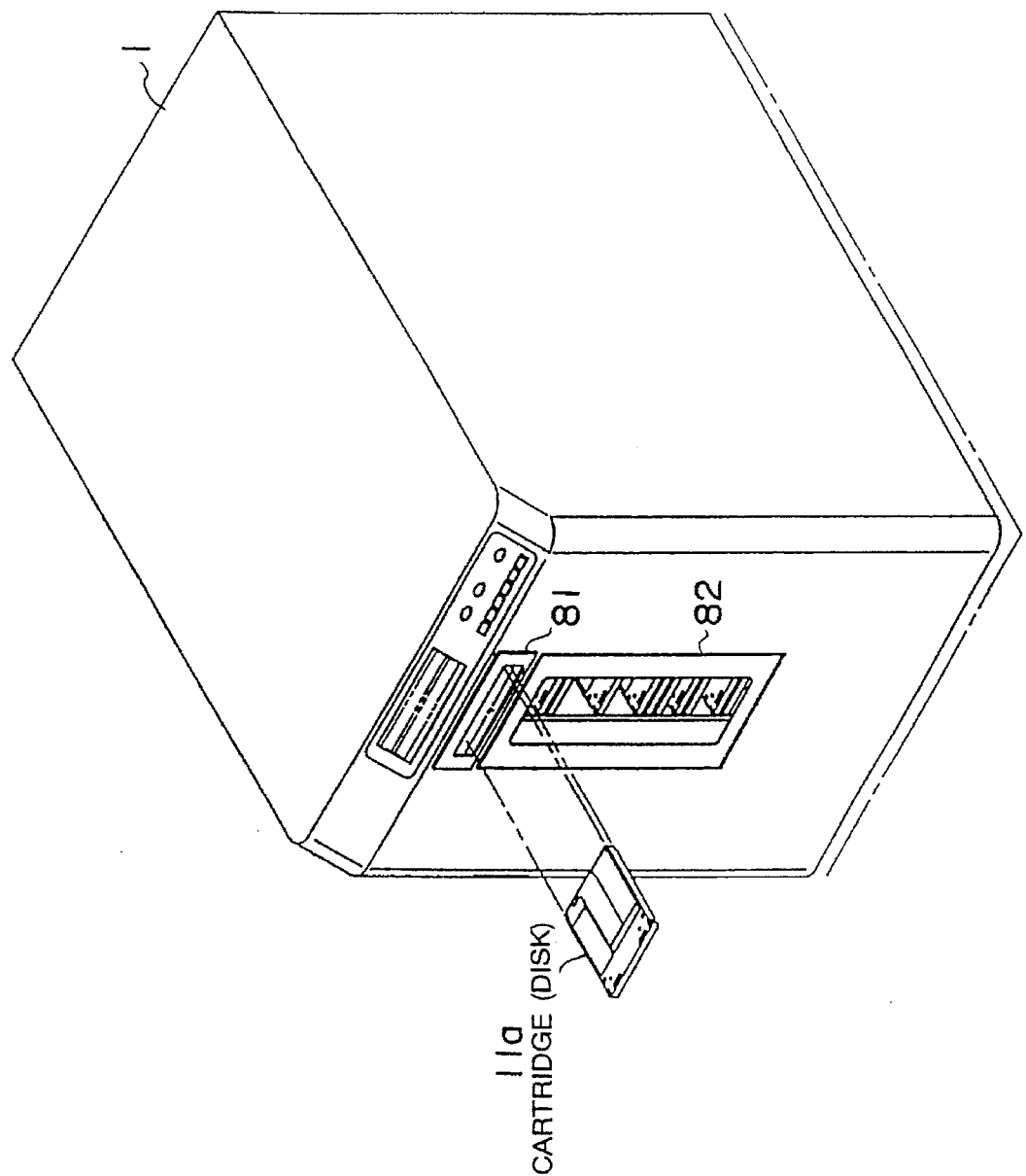
FIG. 3 is a diagram indicating a concrete example of a library device in accordance with embodiment 2 of the present invention.
Figure 4:
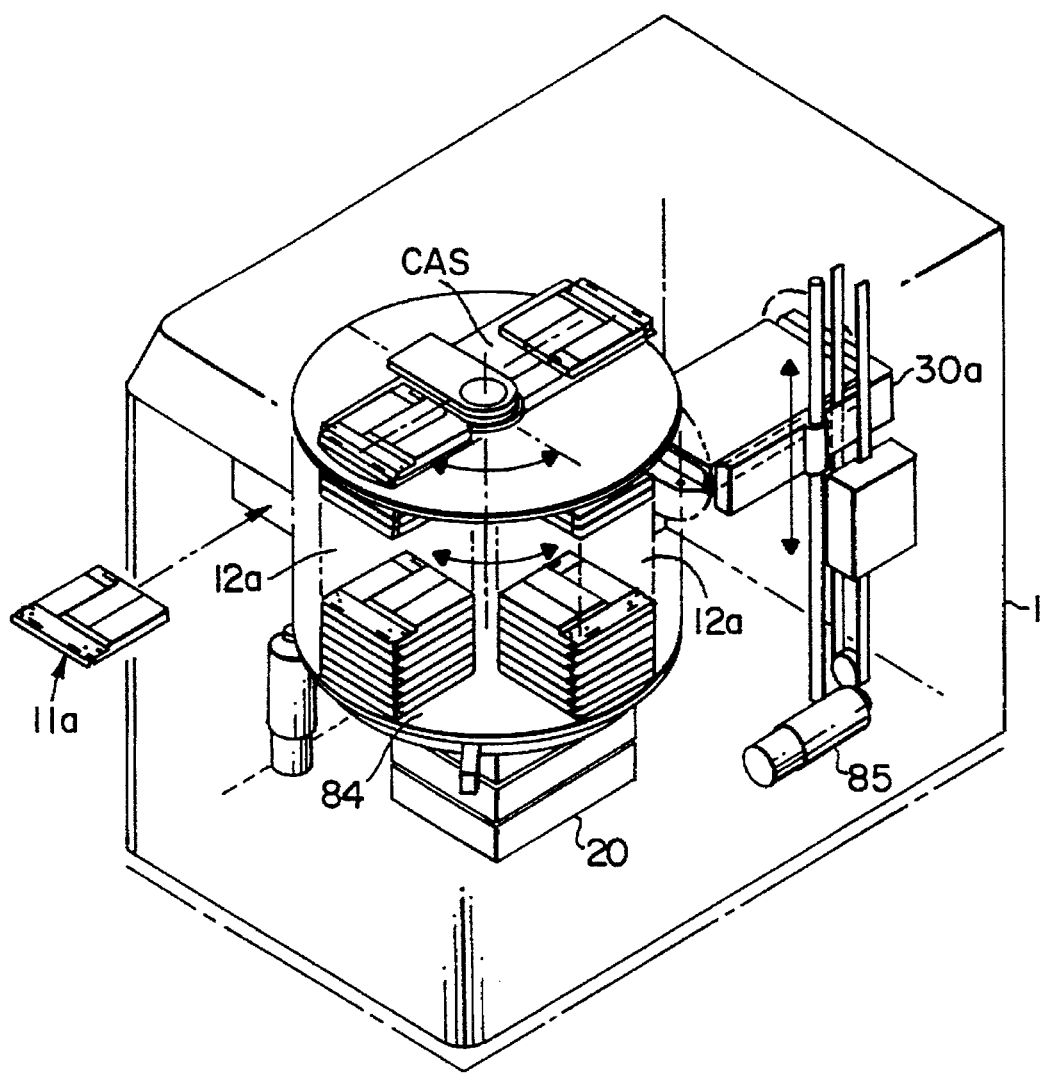
FIG. 4 is a diagram indicating an internal constitution of the library device shown in FIG. 3.

FIG. 3 is a construction diagram indicating a concrete library device in accordance with embodiment 2 of the present invention. FIG. 4 is a diagram indicating the internal constitution of the library device. The library device 1 shown in FIG. 3 is a small-sized device and copies such bulk data as image data into a large quantity of disks without any help from others. The image data is such bulk data as a catalog and a design screen.

As shown in FIG. 3, the library device 1 has a cartridge entrance 81 for taking in and out a cartridge 11a which covers a magneto-optical disk (referred to as disk hereinafter) 11 and a large quantity entrance door 82 for taking in and out a large number of cartridges 11a.

As shown in FIG. 4, the library device 1 comprises a cartridge-charge-discharge structure (CAS), a cell drum 84, a drive unit 20, a plurality of cell units (storage racks) 12a, an accessor 30a as a disk moving unit and a motor 85, and executes installation, removal, recording and a replay of the cartridges automatically.

The cartridge-charge-discharge structure CAS carries the cartridge 11a charged by an operator from the outside to the position where the cartridge 11a is delivered to the accessor 30a, or receives the used cartridge 11a from the accessor 30a, carries the used cartridge 11a to the predetermined position and discharges it to the outside.

The cell drum 84 is a rotating storage rack, and has a plurality of cell units (storage racks) 12a on the circumference thereof. Each of the cell units 12a has more cells than the number of cells capable of storing a plurality of disks 11.

Each of the cell units 12a is rotated by the motor installed on the lower portion. The drive unit 20 is installed on the lower portion of the cell drum 84, and executes a recording and a replay of the data for the cartridge 11a.

The accessor 30a moves the cartridge 11a between the CAS and the drive unit 20 from the cell of cell units 12a facing one another by ascending or descending (on the arrowhead direction in FIG. 4) according to the driving force of the motor 85 following a guide shaft.

According to the library device 1 constructed in the above-mentioned way, the CAS will carry the cartridge 11a to the predetermined position, if the operator charges the cartridge 11a from the cartridge entrance of the CAS. Besides, in addition, the cell drum 84 is rotated by the motor to the position where the cartridge 11a and the accessor 30a face one another.

The accessor 30a carries the cartridge 11a and inserts it into the designated cell after receiving the cartridge. When a command is executed for the recording and replay of the data on the cartridge 11a, the accessor 30a takes out the cartridge 11a from the cell and installs it on the drive unit 20.

The accessor 30a takes out the cartridge 11a from the drive unit 20 and inserts it into the designated cell after the recording and replaying processes of the cartridge 11a are completed. The installation, removal, recording and replay of the cartridge are executed automatically in the above-mentioned way. A large quantity of cartridges 11a can be stored in the library device 1 by the use of rotating cell drum 84. Moreover, a large quantity of disks can be copied, since the data can be recorded in each of the cartridges 11a by rotating the cell drum 84.

Further, the operator only has to modify the data stored in the copying source disk 3 through the personal computer connected to the library device 1. After that, the library device 1 takes out the disk 11 from the storage racks 12 automatically for copying, and then returns the disks 11 to the storage racks 12.

Furthermore, the library device of the present invention can not only be applied to the magneto-optical disk device, but also can be applied to other disk devices such as a magnetic disk device.

Figure 5:
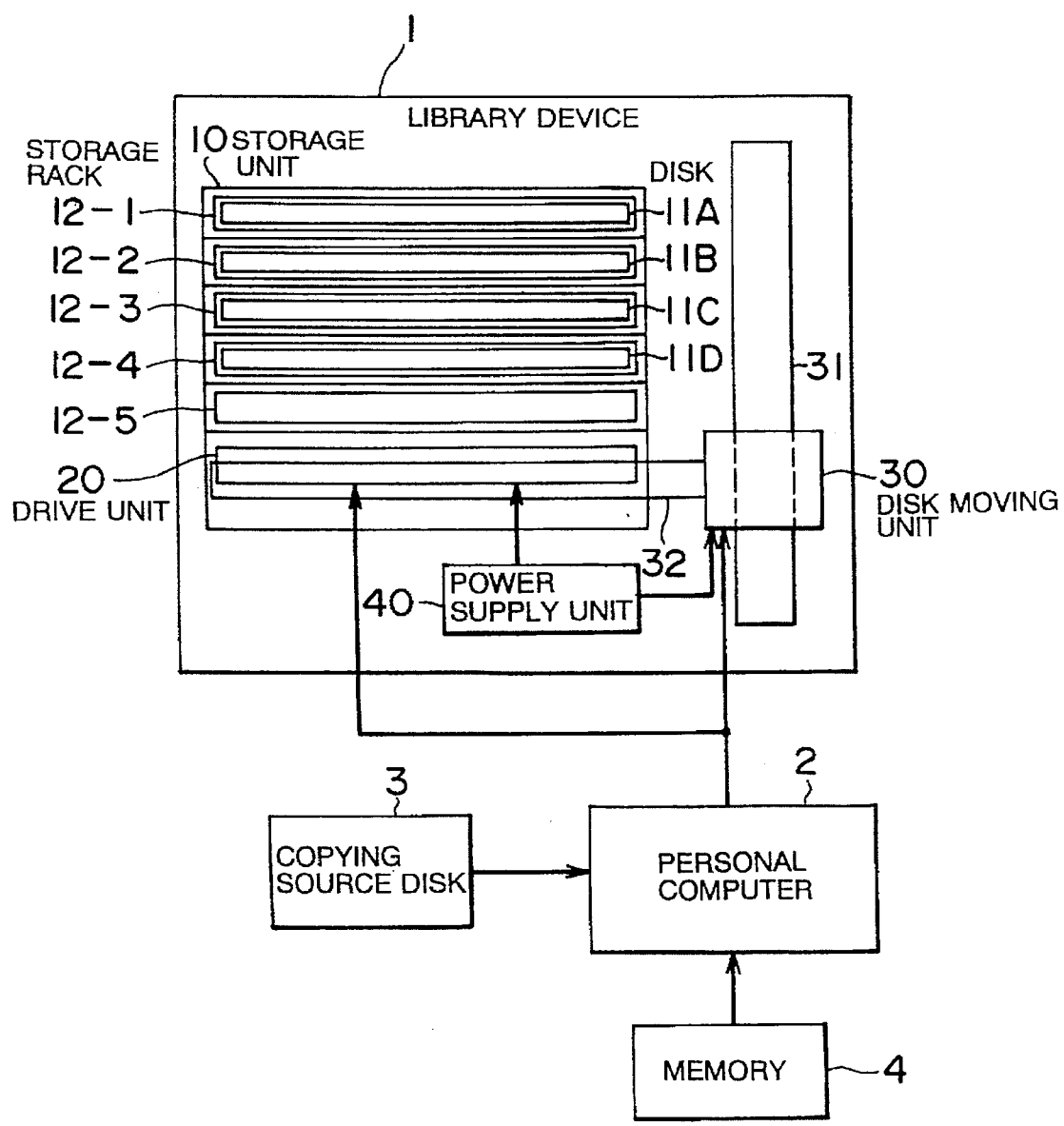
FIG. 5 is a hardware construction diagram of a library device and peripheral devices of embodiment 2 of the present invention.

FIG. 5 is a hardware construction diagram of the library device and its peripheral devices of embodiment 2 of the present invention. In FIG. 5, embodiment 2 is composed of a library device 1, a personal computer 2 connected to the library device 1, a copying source disk 3 connected to the personal computer and a memory 4 connected to the personal computer 2. Further, a host computer can be substituted for the personal computer 2.

The library device 1 comprises a storage unit 10, a drive unit 20 arranged on the lower portion of the storage unit 10, a disk moving unit (also referred to as auto changer unit) 30 for moving the storage unit 10 and the drive unit 20. Further, the library device 1 comprises a power supply unit 40 for supplying the drive unit 20 and the disk moving unit 30 with electric power and an unillustrated printed board unit.

The storage unit 10 has storage racks (also referred to as cells) 12 for storing each of the disks 11 after turning them into cartridges, and has a number of the storage racks 12 which exceeds the number of the disks 11. In the embodiment 2, the storage unit 10 has five storage racks 12 (12-1 through 12-5), and stores four disks 11 (11A through 11D) in every four storage racks of the five storage racks 12.

Further, the number of disks 11 is not limited to the above-mentioned number and the number can be changed according to usefulness. The vacant storage rack 12 is generated when the number of storage racks exceeds the number of the disks 11.

The drive unit 20 drives each of the disks 11 and the copying source disk 3 so as to execute a recording and a replay for each of the disks 11 of the information stored in the copying source magneto-optical disk (referred to as copying source disk hereinafter).

The disk moving unit 30 moves along the fixed shaft 31 and takes out the disks 11 stored in each storage rack 12 when they were copied by the moving shaft 32 in order and inserts them into the drive unit 20. The disk moving unit 30 takes out each of the disks 11 from the drive unit 20 after it is copied, and inserts each of the disks 11 into the storage racks 12 in accordance with the control signal outputted from a storage control unit 50 discussed below. The disk moving unit 30 is moved by the driving force of the unillustrated motor and so on.

The personal computer 2 has a central processing unit and controls the copying source disk 3, the drive unit 20 and the disk moving unit 30. The personal computer 2 also and executes the copying process by executing the programs stored in the memory 4. The personal computer 2 updates the information stored in the copying source disk 3 and sets the updated copying source disk 3 on the library device 1. Further, the updated information may be transmitted directly to a copying unit 60 discussed below.

The library device 1 drives the disk moving unit 30 and copies the disks 11 stored in the storage racks 12 automatically. Further, the library device 1 discriminates between the normal copying and the abnormal copying automatically.

The copying source disk 3 is, for instance, a hard disk, or a compact disk, Read Only Memory (CD-ROM).

Figure 6:
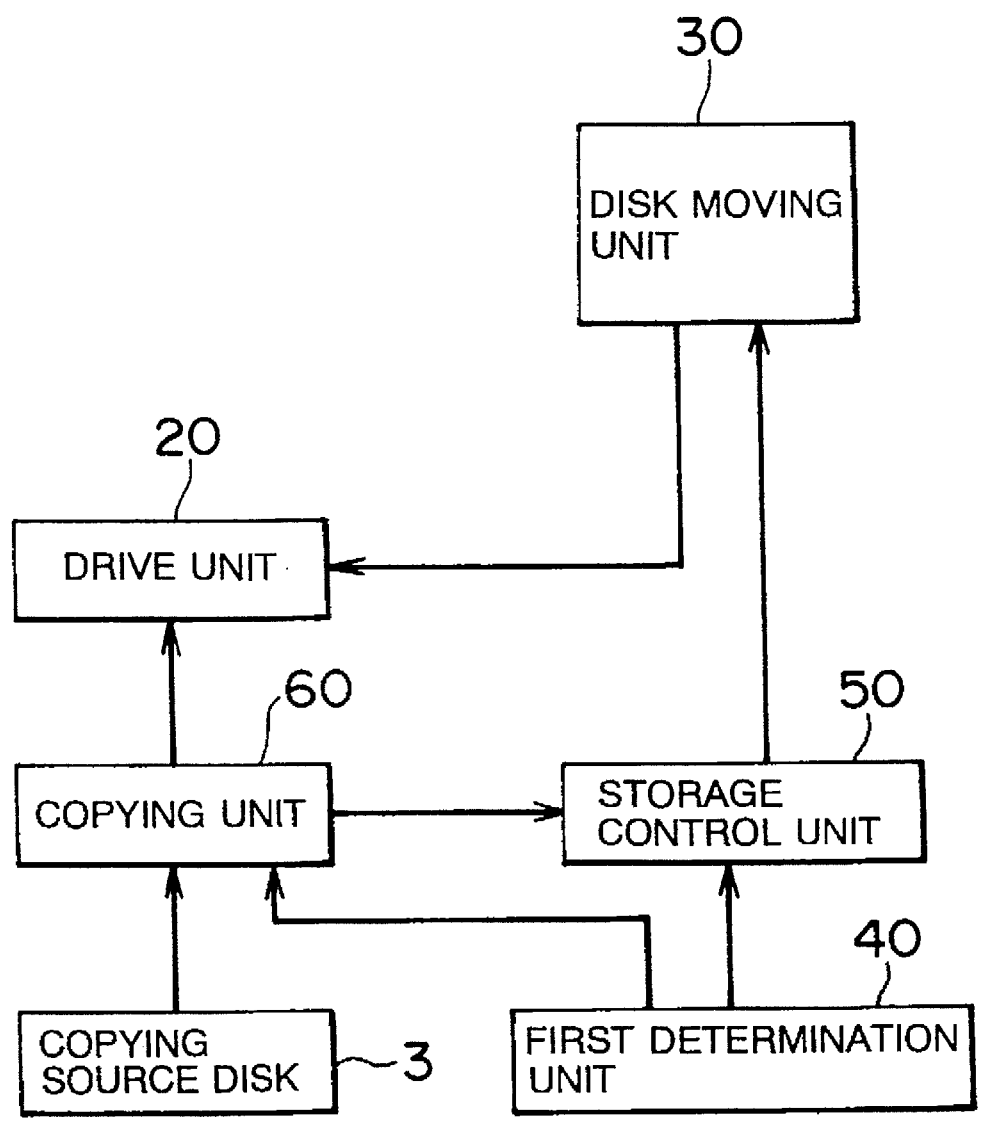
FIG. 6 is a software construction diagram of a library device and peripheral devices of embodiment 2 of the present invention.
Figure 7:
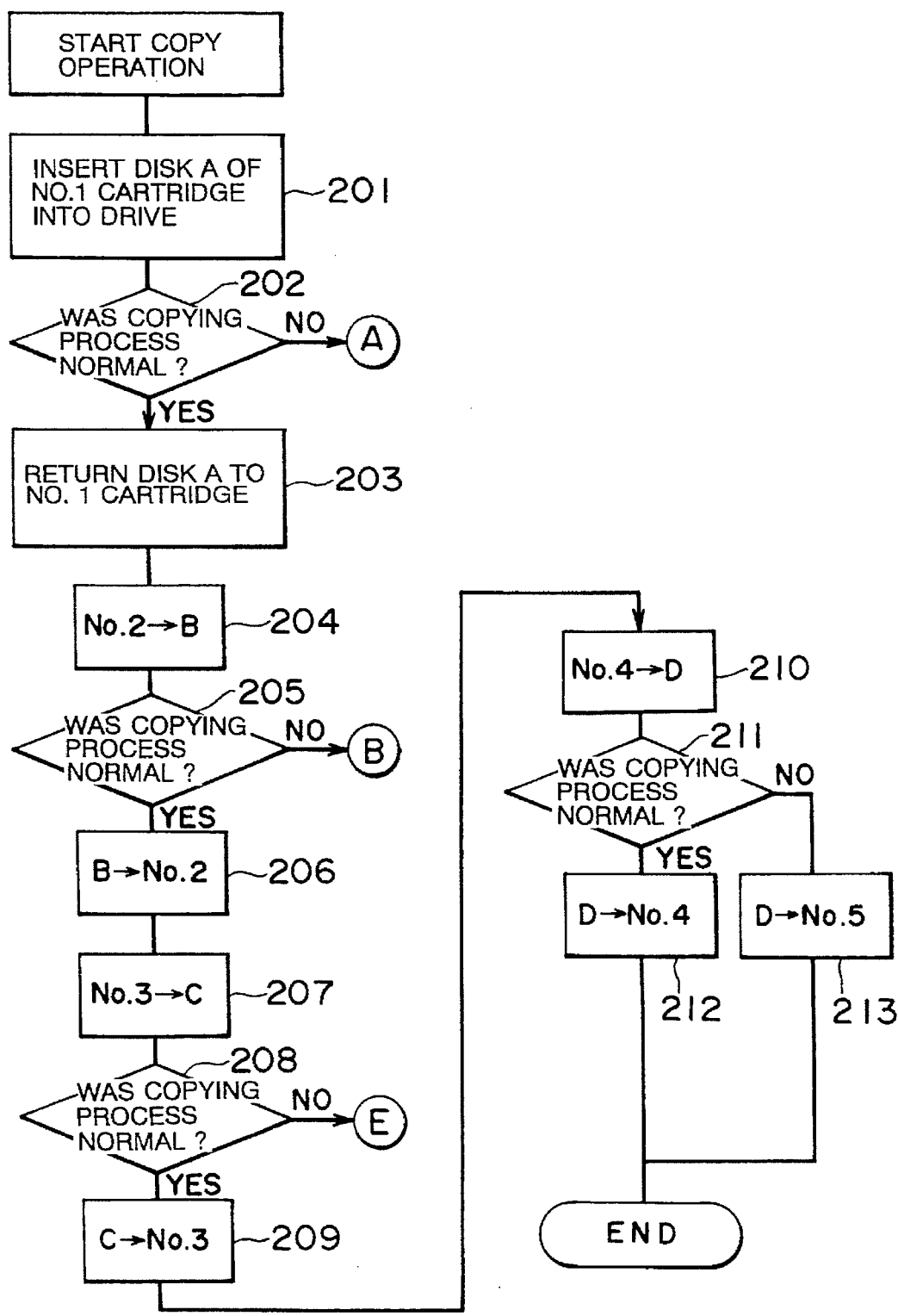
FIG. 7 is a flowchart indicating a whole of a method for selecting copied disks of embodiment 2 of the present invention.

A software construction diagram of the library device and its peripheral devices of embodiment 2 is shown in FIG. 6. The copying process function is realized when the central processing unit executes the programs stored in the memory 4, namely, the software construction shown in FIG. 6 will be described.

The software is composed of a first determination unit 40, a copying unit 60 and a storage control unit 50. The first determination unit 40 determines whether or not the number of the storage racks 12 exceeds the number of disks, and the first determination unit 40 is the function which is realized when the central processing unit executes the programs stored in the memory.

The copying unit 60 reads out information from the copying source disk 3 and executes a copying process for copying the information into each disk inserted into the drive unit 20 in order, where it is determined whether the number of storage racks 12 exceeds the number of disks. The copying unit 60 compares the information of each disk 11 copied by the personal computer 2 with the information stored in the copying source disk 3, and determines whether the copying process is normal or not.

Whether or not the copying process is normal is judged, for instance, by judging whether or not the information stored in the copying source disk 3 conforms with the information stored in the corresponding portion of the disk 11.

The storage control unit 50 controls the disk moving unit 30 so as to store the disks 11 from the storage racks 12 on the upper side of the storage unit 10 in order, when the copying process by the copying unit 60 is normal. The storage control unit 50 controls the disk moving unit 30 so as to store the disks 11 from the storage rack 12 on the lower edge side of the storage unit 10, when the copying process by the copying unit 60 is not normal.

The storage control unit 50 takes out the disks 11 from the storage racks 12 on the upper side as the next disks to be copied and processed, when the copying process is normal. The storage control unit 50 controls the disk moving unit 30 so as to take out the disks 11 from the storage rack 12 on the lower side as the next disks to be copied, when the copying process is not normal.

Then, the operations of embodiment 2 constructed in the above-mentioned way will be described by referring to flowcharts shown in FIG. 7 through FIG. 12. Further, in FIG. 7 through FIG. 12, the storage racks 12-1 through 12-5 are simplified as No. 1 through No. 5, and the disks 11A through 11D are simplified as A through D.

First of all, when the copying operation is started, the first determination unit 40 determines whether or not the number of storage racks 12 exceeds the number of disks, and outputs a control signal to the disk moving unit 30 when the number of the storage racks 12 exceeds the number of disks. The disk moving unit 30 takes out the disk 11A from the storage rack 12-1 and inserts it into the drive unit 20 on the basis of the control signal outputted from the storage control unit 50 (Step 201). The copying unit 60 copies the information stored in the copying source disk 3 into the disk 11A after the drive unit 20 drives the disk 11A.

Further, the copying unit 60 compares the information of the copied disk 11A with the information stored in the copying source disk 3, and determines whether the copying process is normal or not (Step 202).

Hereupon, the disk moving unit 30 takes out the disk 11A from the drive unit 20 and returns it to the storage rack 12-1 on the basis of the control signal C1 outputted from the storage control unit 50 indicating that the copying process is normal, when the copying process is normal (Step 203).

Then, the disk moving unit 30 takes out the disk 11B from the storage rack 12-2 and inserts it into the drive unit 20 on the basis of the control signal outputted from the storage control unit 50 (Step 204). The copying unit 60 copies the information stored in the copying source disk 3 into the disk 11B after the drive unit 20 drives the disk 11B, and determines whether the information of the copied disk 11B is normal or not (Step 205).

Hereupon, the disk moving unit 30 takes out the disk 11B from the drive unit 20 and returns it to the storage rack 12-2 on the basis of the control signal outputted from the storage control unit 50, when the copying process is normal (Step 206).

Then, the disk moving unit 30 takes out the disk 11C from the storage rack 12-3 and inserts it into the drive unit 20 on the basis of the control signal outputted from the storage control unit 50 (Step 207). The copying unit 60 copies the information stored in the copying source disk 3 into the disk 11C and determines whether the copied disk 11C is normal or not, after the drive unit 20 drives the disk 11C (Step 208).

Hereupon, the disk moving unit 30 takes out the disk 11C from the drive unit 20 and returns it to the storage rack 12-3, when the copying process is normal (Step 209).

Then, the disk moving unit 30 takes out the disk 11D from the storage rack 12-4 and inserts it into the drive unit 20 on the basis of the control signal outputted from the storage control unit 50 (Step 210). The copying unit 60 copies the information stored in the copying source disk 3 into the disk 11D and determines whether the information of the copied disk 11D are normal or not, after the drive unit 20 drives the disk 11D (Step 211).

Hereupon, the disk moving unit 30 takes out the disk 11D from the drive unit 20 and returns it to the storage rack 12-4 on the basis of the control signal outputted from the storage control unit 50, when the copying process is normal (Step 212).

Further, in Step 211, when the copying process is not normal (copying error), the disk moving unit 30 takes out the disk 11D from the drive unit 20 and returns it to the storage rack 12-5 on the basis of the control signal C2 outputted from the storage control unit 50 indicating that the copying process is not normal (Step 213).

Figure 8:
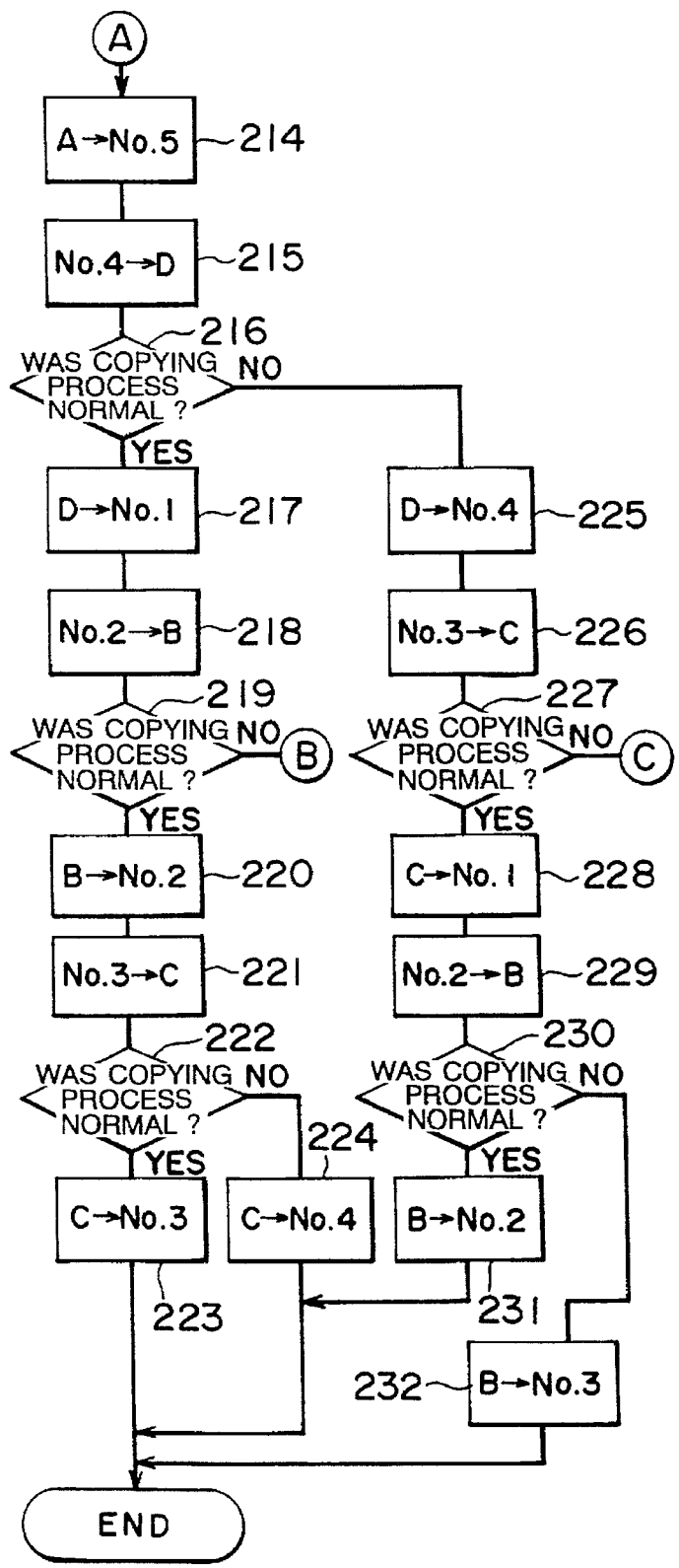
FIG. 8 is a flowchart when an error has occurred in disk 11A of embodiment 2.

On the other hand, in Step 202, when the copying process is not normal, the disks are processed in accordance with the flowchart shown in FIG. 8. First of all, the disk moving unit 30 takes out the disk 11A from the drive unit 20 and returns it to the storage rack 12-5 on the lower side, on the basis of the control signal C2 outputted from the storage control unit 50 indicating that the copying process is not normal (Step 214).

Then, the disk moving unit 30 takes out the disk 11D from the storage rack 12-4 and inserts it into the drive unit 20 on the basis of the control signal outputted from the storage control unit 50 (Step 215). The copying unit 60 copies the information stored in the copying source disk 3 into the disk 11D and determines whether the information of the copied disk 11D are normal or not, after the drive unit 20 drives the disk 11D (Step 216).

Hereupon, the disk moving unit 30 takes out the disk 11D from the drive unit 20 and returns it to the storage rack 12-1 on the basis of the control signal C1 outputted from the storage control unit 50, when the copying process is normal (Step 217).

Then, the disk moving unit 30 takes out the disk 11B from the storage rack 12-2 and inserts it into the drive unit 20 on the basis of the control signal outputted from the storage control unit 50 (Step 218). The copying unit 60 copies the information stored in the copying source disk 3 into the disk 11B and determines whether the information of the copied disk 11B are normal or not, after the drive unit 20 drives the disk 11B (Step 219).

Hereupon, the disk moving unit 30 takes out the disk 11B from the drive unit 20 and returns it to the storage rack 12-2 on the basis of the control signal C1 outputted from the storage control unit 50, when the copying process is normal (Step 220).

Then, the disk moving unit 30 takes out the disk 11C from the storage rack 12-3 and inserts, it into the drive unit 20 on the basis of the control signal outputted from the storage control unit 50 (Step 221). The copying unit 60 copies the information stored in the copying source disk 3 into the disk 11C after the drive unit 20 drives the disk 11c and determines whether the information of the copied disk 11C are normal or not (Step 222).

Hereupon, the disk moving unit 30 takes out the disk 11C from the drive unit 20 and returns it to the storage rack 12-3 on the basis of the control signal C1 outputted from the storage control unit 50, when the copying process is normal (Step 223).

Further, in Step 222, when the copying process is not normal, the disk moving unit 30 takes out the disk 11C from the drive unit 20 and returns it to the storage rack 12-4 on the basis of the control signal C2 outputted from the storage control unit 50 (Step 224).

On the other hand, in Step 216, when the copying process is not normal, the disk moving unit 30 takes out the disk 11D from the drive unit 20 and returns it to the storage rack 12-4 on the basis of the control signal C2 outputted from the storage control unit 50 (Step 225).

Then, the disk moving unit 30 takes out the disk 11C from the storage rack 12-3 and inserts it into the drive unit 20 on the basis of the control signal outputted from the storage control unit 50 (Step 226). The copying unit 60 copies the information stored in the copying source disk 3 into the disk 11C and determines whether the copied information of the disk 11C are normal or not, after the drive unit 20 drives the disk 11C (Step 227).

Hereupon, the disk moving unit 30 takes out the disk 11C from the drive unit 20 and returns it to the storage rack 12-1, when the copying process is normal (Step 228).

Then, the disk moving unit 30 takes out the disk 11B from the storage rack 12-2 and inserts it into the drive 20 on the basis of the control signal outputted from the storage control unit 50 (Step 229). The copying unit 60 copies the information stored in the copying source disk 3 into the disk 11B, after the drive unit 20 drives the disk 11B. The copying unit 60 compares the information of the copied disk 11B with the information stored in the copying source disk 3 and determines whether the copying process is normal or not (Step 230).

Hereupon, the disk moving unit 30 takes out the disk 11B from the drive unit 20 and returns it to the storage rack 12-2 on the basis of the control signal C1, when the copying process is normal (Step 231).

Further, in Step 230, when the copying process is not normal, the disk moving unit 30 takes out the disk 11B from the drive unit 20 and returns it to the storage rack 12-3 on the basis of the control signal C2 outputted from the storage control unit 50 (Step 232).

Figure 9:
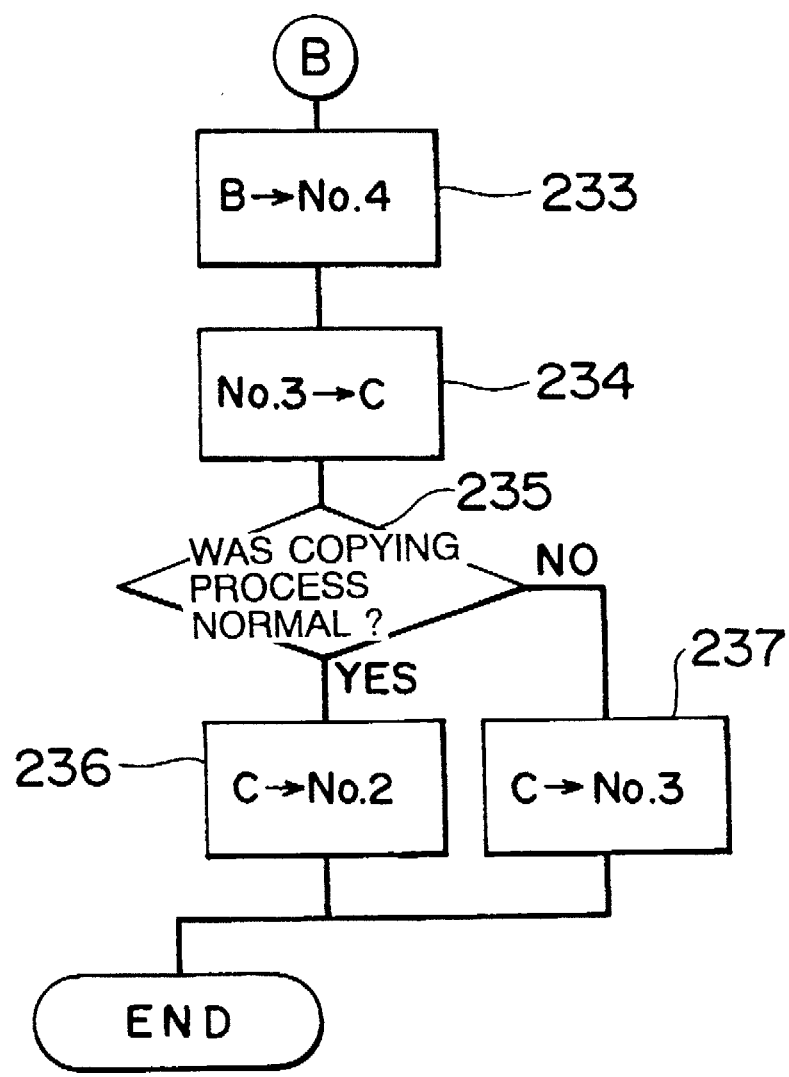
FIG. 9 is a flowchart when an error has occurred in disk 11A and disk 11B of embodiment 2.

On the other hand, the process is executed in accordance with the flowchart shown in FIG. 9, when the copying process is not normal. First of all, the disk moving unit 30 takes out the disk 11B from the drive unit 20 and returns it to the storage rack 12-4 on the basis of the control signal C2 outputted from the storage control unit 50 (Step 233).

Then, the disk moving unit 30 takes out the disk 11C from the storage rack 12-3 and inserts it into the drive unit 20 on the basis of the control signal outputted from the storage control unit 50 (Step 234). The copying unit 60 copies the information stored in the copying source disk 3 into the disk 11C and determines whether the information of the copied disk 11C are normal or not, after the drive unit 20 drive the disk 11C (Step 235).

Hereupon, the disk moving unit 30 takes out the disk 11C from the drive unit 20 and returns it to the storage rack 12-2, when the copying process is normal (Step 236).

Further, in Step 235, when the copying process is not normal, the disk moving unit 30 takes out the disk 11C from the drive unit 20 and returns it to the storage rack 12-3 on the basis of the control signal C2 outputted from the storage control unit 50 (Step 237).

Figure 10:
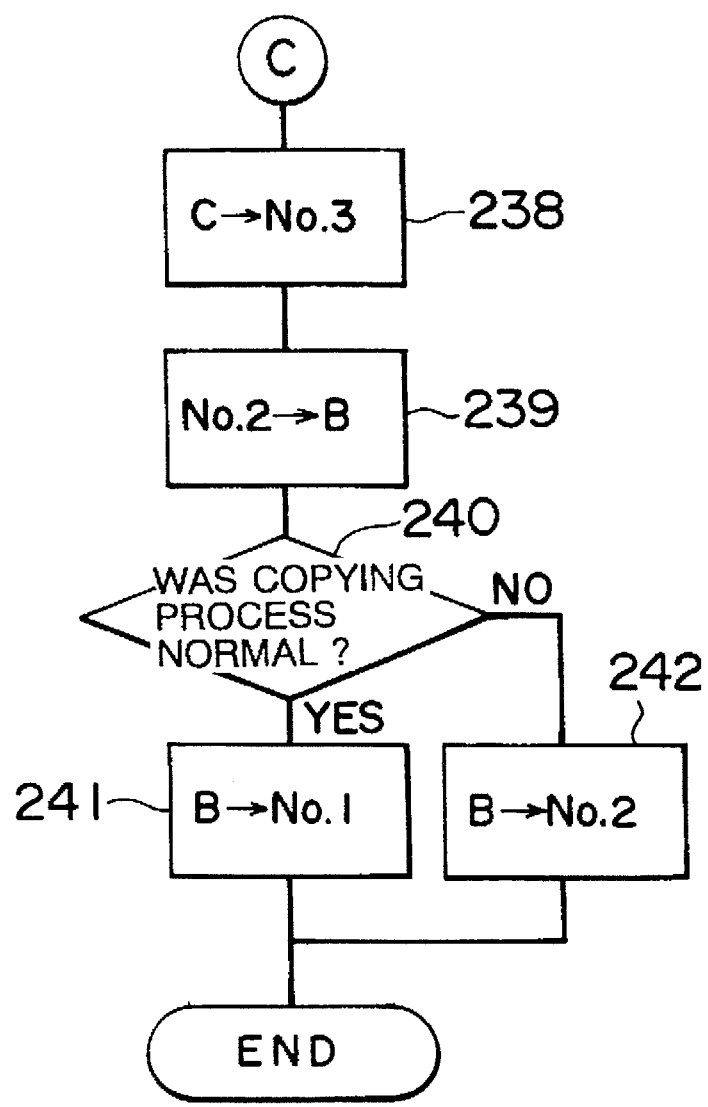
FIG. 10 is a flowchart when an error has occurred in disk 11A and disk 11C of embodiment 2.

On the other hand, in Step 227, when the copying process is not normal, the process is executed in accordance with the flowchart shown in FIG. 10. First of all, the disk moving unit 30 takes out the disk 11C from the drive unit 20 and returns it to the storage rack 12-3 on the basis of the control signal C2 outputted from the storage control unit 50 (Step 238).

Then, the disk moving unit 30 takes out the disk 11B from the storage rack 12-2 and inserts it to the drive unit 20 on the basis of the control signal outputted from the storage control unit 50 (Step 239). The copying unit 60 copies the information stored in the copying source disk 3 into the disk 11B and determines whether the information of the copied disk 11B are normal or not, after the drive unit 20 drives the disk 11B (Step 240).

Hereupon, the disk moving unit 30 takes out the disk 11B from the drive unit 20 and returns it to the storage rack 12-1, when the copying process is normal (Step 241).

Further, in Step 240, when the copying process is not normal, the disk moving unit 30 takes out the disk 11B from the drive 20, and returns it to the storage rack 12-2 on the basis of the control signal C2 outputted from the storage control unit 50 (Step 242).

Figure 11:
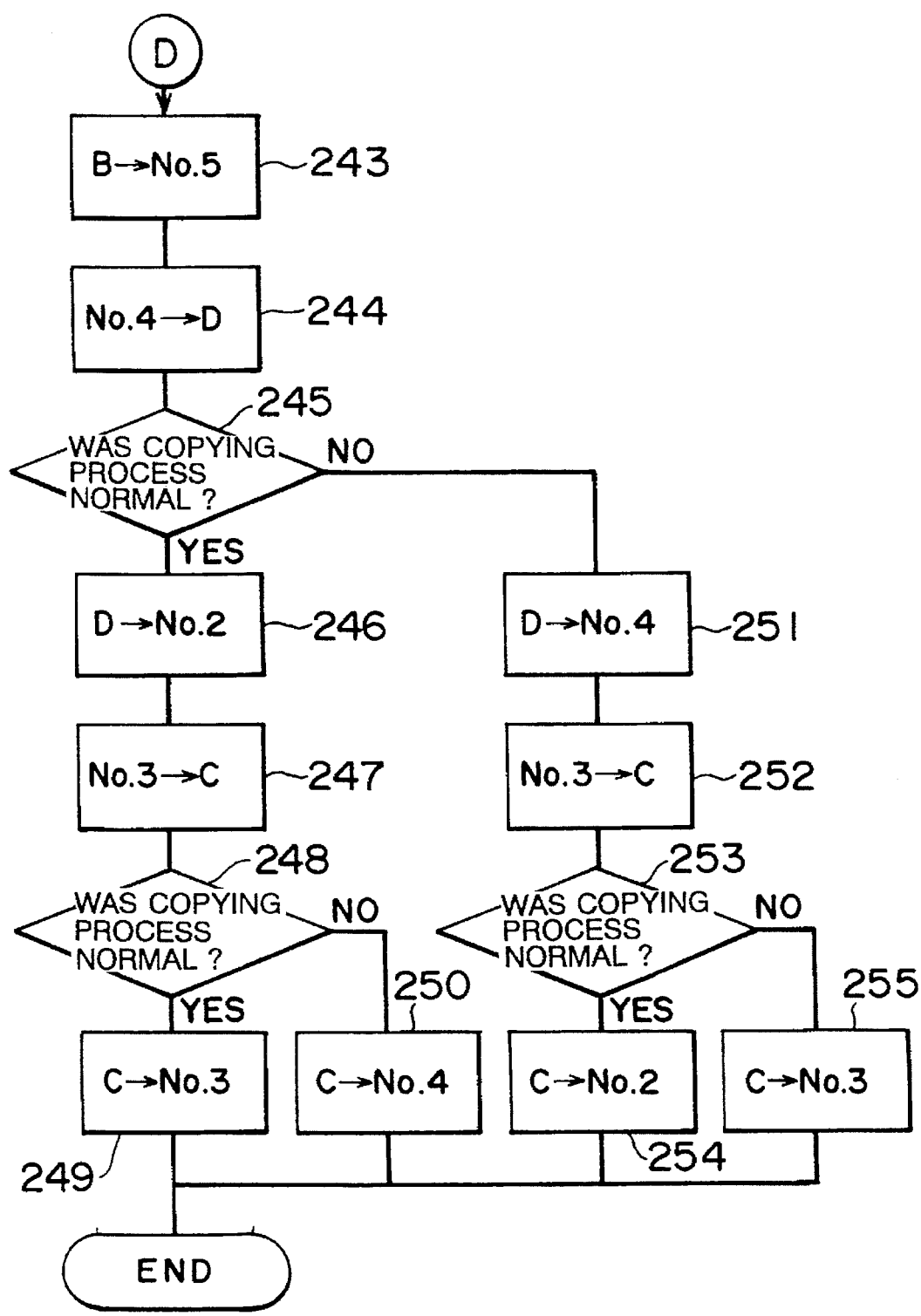
FIG. 11 is a flowchart showing when disk 11A is normal and an error has occurred in disk 11B of embodiment 2.

On the other hand, in Step 205, the process is executed in accordance with the flowchart shown in FIG. 11, when the copying process is not normal. First of all, the disk moving unit 30 takes out the disk 11B from the drive unit 20 and returns it to the storage rack 12-5 on the basis of the control signal C2 outputted from the storage control unit 50 (Step 243).

Then, the disk moving unit 30 takes out the disk 11D from the storage rack 12-4 and inserts it into the drive unit 20 on the basis of the control signal outputted from the storage control unit 50 (Step 244). The copying unit 60 copies the information stored in the copying source disk 3 into the disk 11D and determines whether the information of the copied disk 11D are normal or not, after the drive unit 20 drives the disk 11D (Step 245).

Hereupon, the disk moving unit 30 takes out the disk 11D from the drive unit 20 on the basis of the control signal C1 and returns it to the storage rack 122, when the copying process is normal (Step 246).

Then, the disk moving unit 30 takes out the disk 11C from the storage rack 12-3 on the basis of the control signal and inserts it into the drive unit 20 (Step 247). The copying unit 60 copies the information stored in the copying source disk 3 into the disk 11C and determines whether the information of the copied disk 11C are normal or not, after the drive unit 20 drives the disk 11C (Step 248).

Hereupon, the disk moving unit 30 takes out the disk 11C from the drive unit 20 and returns it to the storage rack 12-3 on the basis of the control signal C1 outputted from the storage control unit 50, when the copying process is normal (Step 249).

Further, in Step 248, when the copying process is not normal, the disk moving unit 30 takes out the disk 11C from the drive unit 20 and returns it to the storage rack 12-4 on the basis of the control signal C2 outputted from the storage control unit 50 (Step 250).

On the other hand, in Step 245, when the copying process is not normal, the disk moving unit 30 takes out the disk 11D from the drive unit 20 and returns it to the storage rack 12-4 on the basis of the control signal C2 outputted from the storage control unit 50 (Step 251).

Then, the disk moving unit 30 takes out the disk 11C from the storage rack 12-3 and inserts it into the drive unit 20 on the basis of the control signal outputted from the storage control unit 50 (Step 252). The copying unit 60 copies the information stored in the copying source disk 3 into the disk 11C and determines whether the information of the copied disk 11C are normal or not, after the drive unit 20 drives the disk 11C (Step 253).

Hereupon, the disk moving unit 30 takes out the disk 11C from the drive unit 20 and returns it to the storage rack 12-2, when the copying process is normal (Step 254).

Further, in Step 253, when the copying process is not normal, the disk moving unit 30 takes out the disk 11C from the drive unit 20 and returns it to the storage rack 12-3 on the basis of the control signal C2 outputted from the storage control unit 50 (Step 255).

Figure 12:
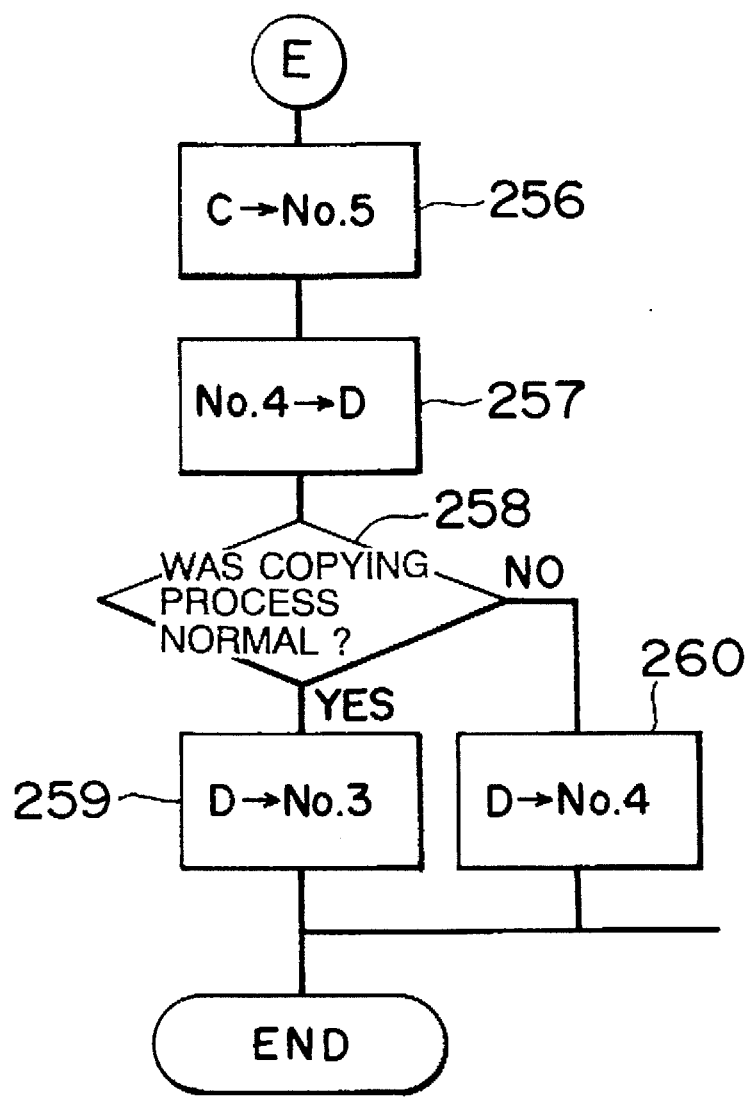
FIG. 12 is a flowchart showing when disk 11A and disk 11B are normal, and an error has occurred in disk 11C of embodiment 2.

On the other hand, in Step 208, the process is executed in accordance with the flowchart shown in FIG. 12, when the copying process is not normal. First of all, the disk moving unit 30 takes out the disk 11C from the drive unit 20 and returns it to the storage rack 12-5 on the basis of the control signal C2 outputted from the storage control unit 50 (Step 256).

Then, the disk moving unit 30 takes out the disk 11D from the storage rack 12-4 and inserts it into the drive unit 20 on the basis of the control signal outputted from the storage control unit 50 (Step 257). The copying unit 60 copies the information stored in the copying source disk 3 into the disk 11D and determines whether the information of the copied disk 11D are normal or not, after the drive unit 20 drives the disk 11D (Step 258).

Hereupon, the disk moving unit 30 takes out the disk 11D from the drive unit 20 and returns it to the storage rack 12-3 on the basis of the control signal C1 outputted from the storage control unit 50, when the copying process is normal (Step 259).

Further, in the Step 258, when the copying process is not normal, the disk moving unit 30 takes out the disk 11D from the drive unit 20 and returns it to the storage rack 12-4 on the basis of the control signal C2 outputted from the storage control unit 50 (Step 260).

As described hereinbefore, one vacant storage rack is generated between the normal disk stored from one side of the storage racks and the error disk stored from the other side of the storage racks, since the number of copied disks (11A–11D) is one less than the number of storage racks.

Accordingly, the operator can easily distinguish between the normal disks and the error disks by identifying the vacant storage rack. Besides, the operator can use the storage racks efficiently by setting the number of storage racks so that it will be one more than the number of disks.

The storage control unit 50 controls the disks so as to take out the disks from one side of the storage racks 12 as the next disk to be copied and processed when the copying process is normal, controls the disks so as to take out the disks from the other side of the storage racks 12 when the copying process is not normal. The disks can all be stored in the storage racks even if the error disks are generated continuously, or the normal disks are generated continuously, when the number of the storage racks is set so that it will be one more than the number of disks.

Figure 13:
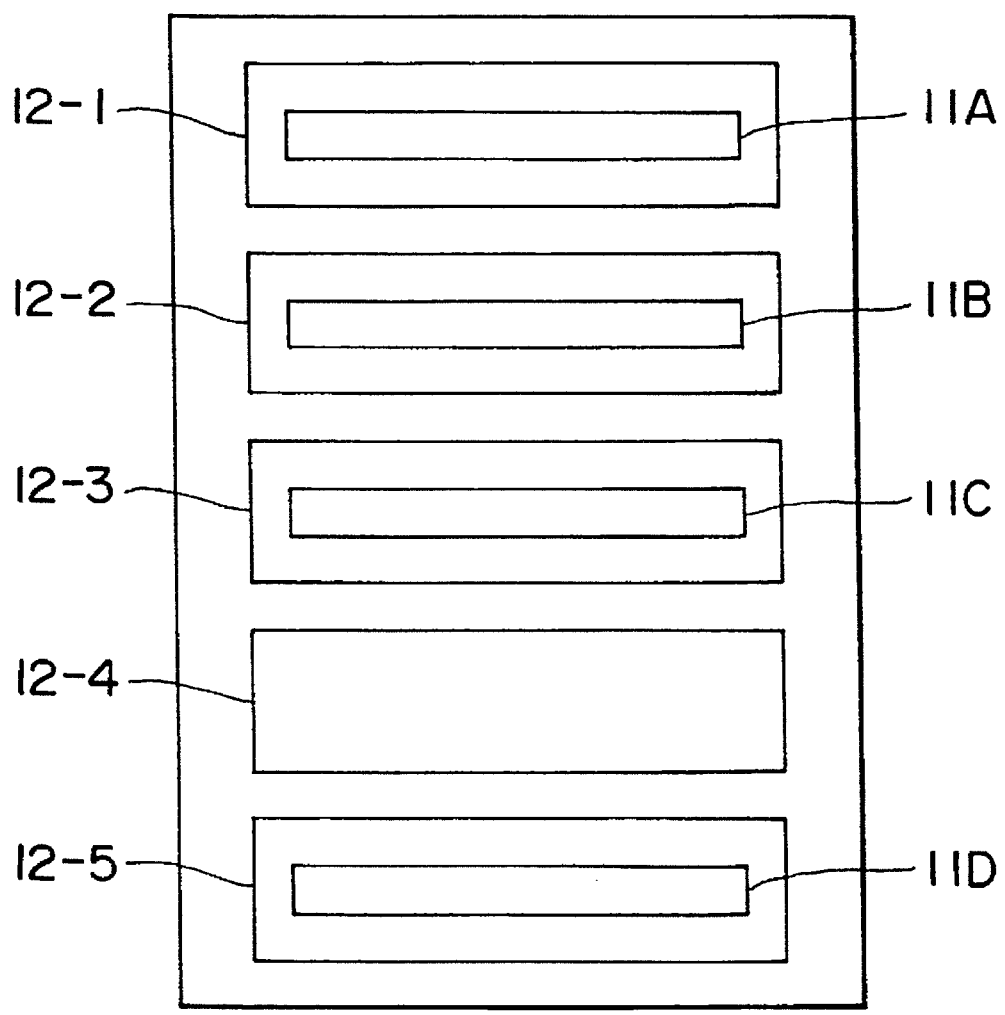
FIG. 13 is a diagram indicating an example of storing copied disks in a storage rack.

FIG. 13 is a diagram indicating an example of storing the four copied disks 11A through 11D into the storage racks. In the example shown in FIG. 13, the disks 11A through 11C are processed as normal disks from Step 201 to Step 210. The disk 11D is processed as an abnormal disk in Step 211. The disks 11A through 11C are stored in the storage racks 12-1 through 12-3. It can be easily understood that the number of the disk in which the copying error has occurred is one, since a single disk 11D is stored in the storage rack 12-5 will be a vacant storage rack 12-4.

Further, in embodiment 2, for instance, a hard disk or a floppy disk can be substituted for the magneto-optical disk as the storage medium to be copied.

<EMBODIMENT 3>

Figure 14:
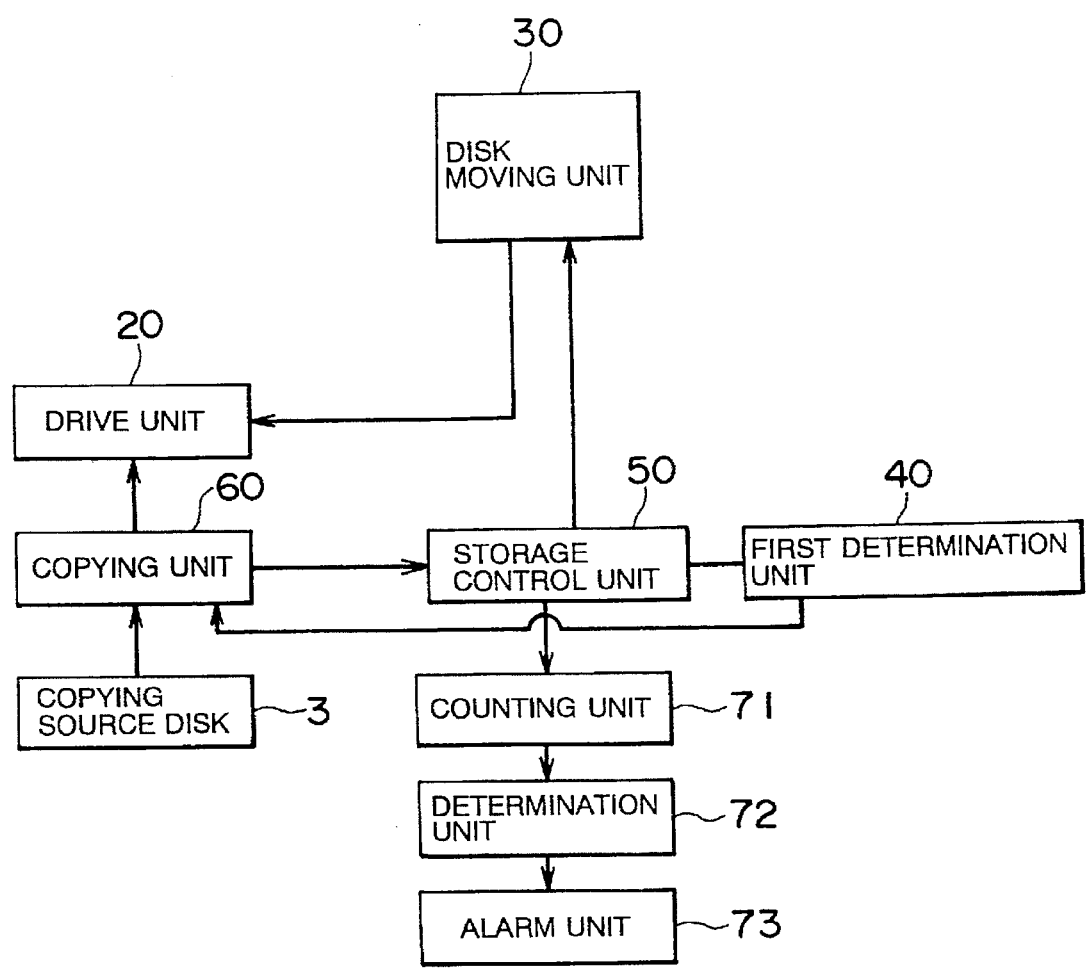
FIG. 14 is a construction diagram of a library device and peripheral devices of embodiment 3 of the present invention.

Embodiment 3 of the present invention will now be described. The construction diagram of the library device of embodiment 3 is shown in FIG. 14. In FIG. 14, the library device comprises a counting unit 71 connected to a storage control unit 50, a determination unit 72 connected to the counting unit 71 and an alarm unit 73 connected to the determination unit 72.

The counting unit 71 is a counter, and counts the number of error disks (whose copying process is not normal) and the number of normal disks (whose copying process is normal). The determination unit 72 determines whether or not the number of the error disks counted by the counting unit 71 has exceeded the predetermined number. The alarm unit 73 is a speaker and so on, and sounds an alarm when the number of error disks has exceeded the predetermined number. The predetermined number of error disks is set to be half of the total number of copied disks.

Further, other constructions are the same as those of embodiment 2, so description of the identical parts will be omitted and they will be indexed with the same numbers as used in the other embodiments.

Figure 15:
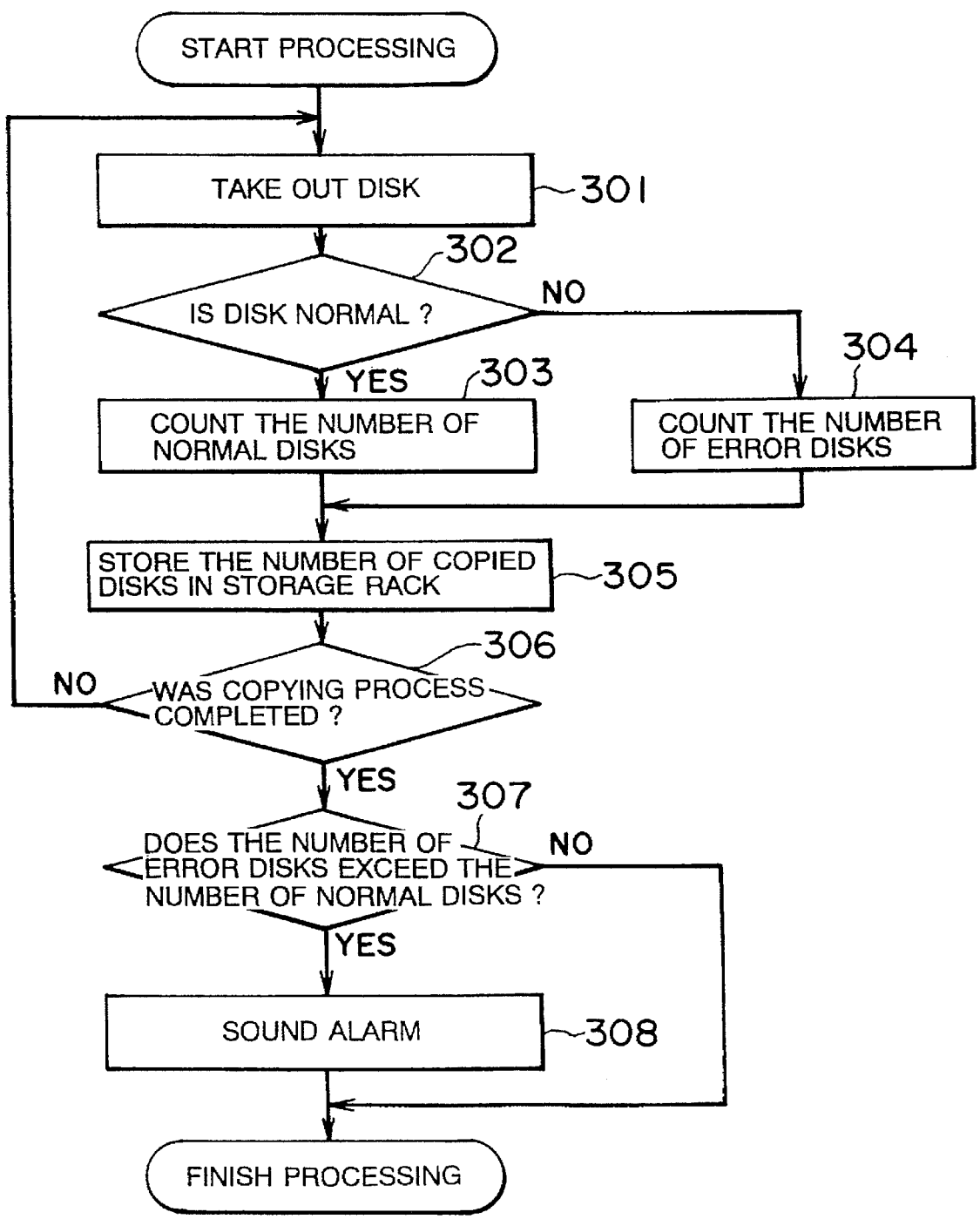
FIG. 15 is a flowchart indicating a method for selecting copied disks of embodiment 3.

The method for selecting copied disks of embodiment 3 will be described by using FIG. 15. First of all, the disk moving unit 30 takes out the disk 11 from the storage rack 12 (Step 301), and the copying unit 60 executes a copying process for the disk 11 and determines whether or not the copying process is normal (Step 302).

The counting unit 71 counts the number of normal disks when the copying process is normal (Step 303). The counting unit 71 counts the number of error disks when the copying process is not normal (Step 304).

Then, the disk moving unit 30 stores the copied disks in the storage rack under the control of the storage control unit 50 (Step 305). Further, the storage control unit 50 determines whether or not all of the disks to be copied have been copied (i.e. whether or not the copying process has been completed) (Step 306).

If the copying process is not completed, the process returns to Step 301 and the processes from Step 301 to Step 305 are repeated. Further, Steps 301, 302, 305 and 306 are completely the same as those of embodiment 2.

Then, when the copying process is completed, the determination unit 72 determines whether or not the number of error disks counted by the counting unit 71 exceeds the number of normal disks (Step 307). The alarm unit 73 sounds an alarm when the number of error disks exceeds the number of normal disks.

Namely, according to embodiment 3, the operator can easily recognize that there are too many error disks, since the alarm is sounded when the number of the error disks exceeds the predetermined number.

<EMBODIMENT 4>

Figure 16:
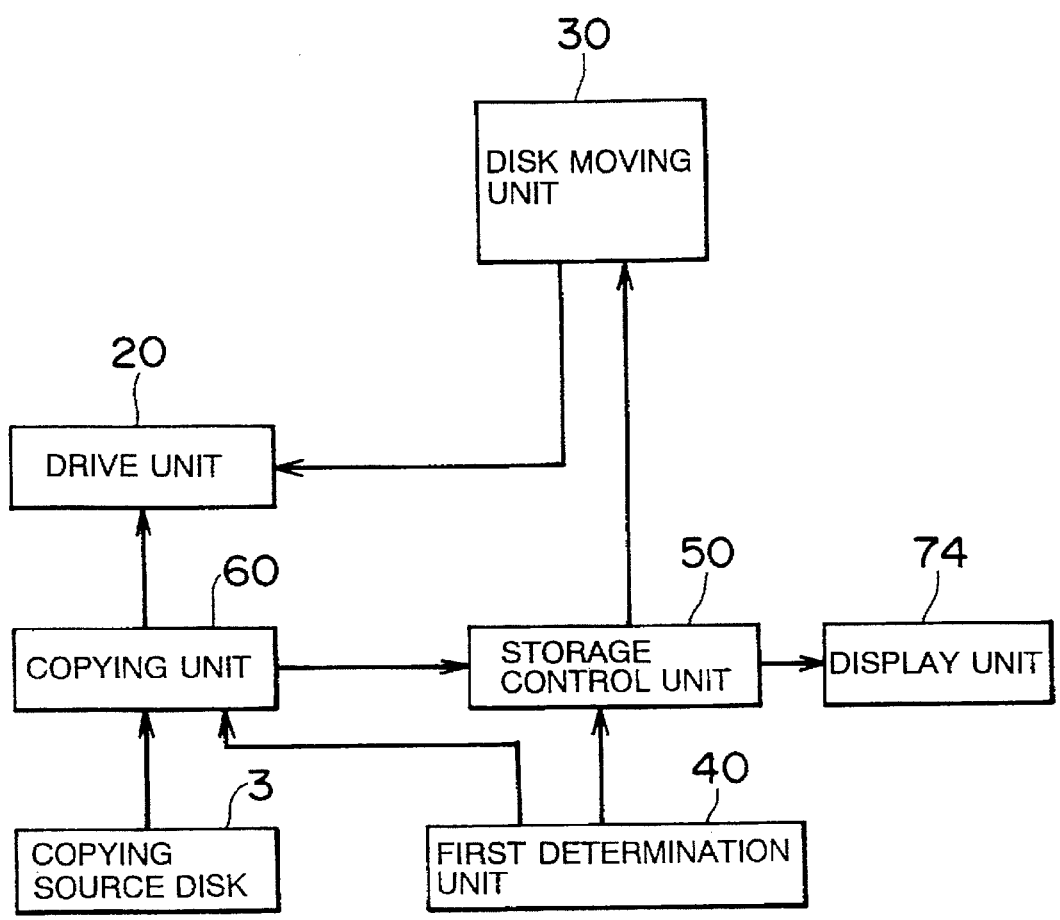
FIG. 16 is a construction diagram indicating a library device and peripheral devices of embodiment 4.

The embodiment 4 of the present invention will be described. The construction diagram of the library device of embodiment 4 is shown in FIG. 16. The storage rack screen is shown in FIG. 17. In FIG. 16, the library device is provided with a display unit 74 connected to a storage control unit 50. Further, other constructions are the same as those of the embodiment 2, so the description of the identical parts will be omitted and they will be indexed with the same numbers as used in the other embodiments.

As shown in FIG. 17A–FIG. 17E, the display unit 74 displays five storage rack positions k1–K5 corresponding to the five storage racks described in embodiment 1 on the screen, after the copying process of each disk 11 is completed.

The display unit 74 identifies and displays a vacant storage rack indicator corresponding to the position of the vacant storage rack such as that shown in FIGS. 17A through 17E where there are five storage racks and four disks for the storage rack. The display shows the number of error disks and the storage rack indicators display the normal disks and the error disks existing on both sides of the vacant storage rack screen.

In the examples shown in FIG. 17A–FIG. 17E, the vacant storage rack indicator is displayed in black.

Figure 17A:
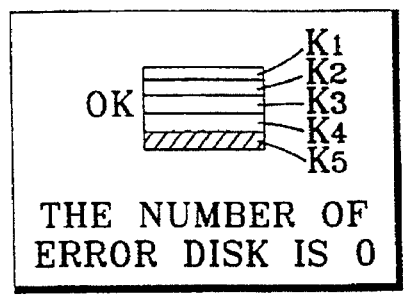
FIG. 17A–FIG. 17E are construction diagrams indicating storage rack screens on the screens of embodiment 4.
Figure 17B:
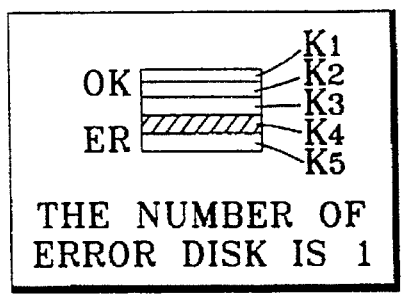
Figure 17C:
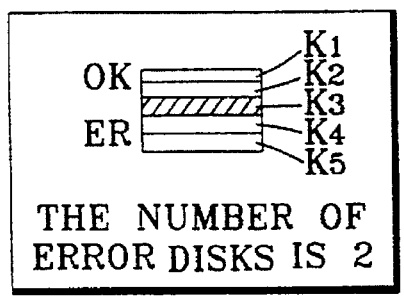
Figure 17D:
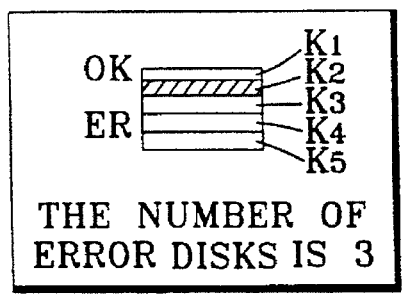
Figure 17E:
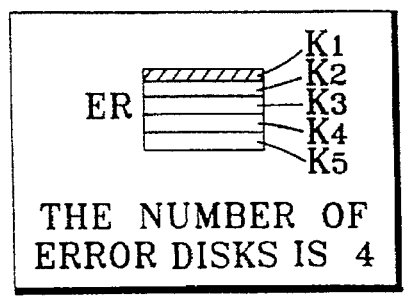

In FIG. 17A, it can be understood that the number of the error disk is 0, since the vacant storage rack indicator is in the storage position K5. In FIG. 17B, it can be understood that the number of error disks is one, since the vacant storage rack indicator is in the storage rack position K4. In FIG. 17C, it can be understood that the number of the error disks is two, since the vacant storage rack indicator is in the storage rack position K3.

As mentioned hereinbefore, the number of error disks can be easily understood on the screen.

<EMBODIMENT 5>

Figure 18:
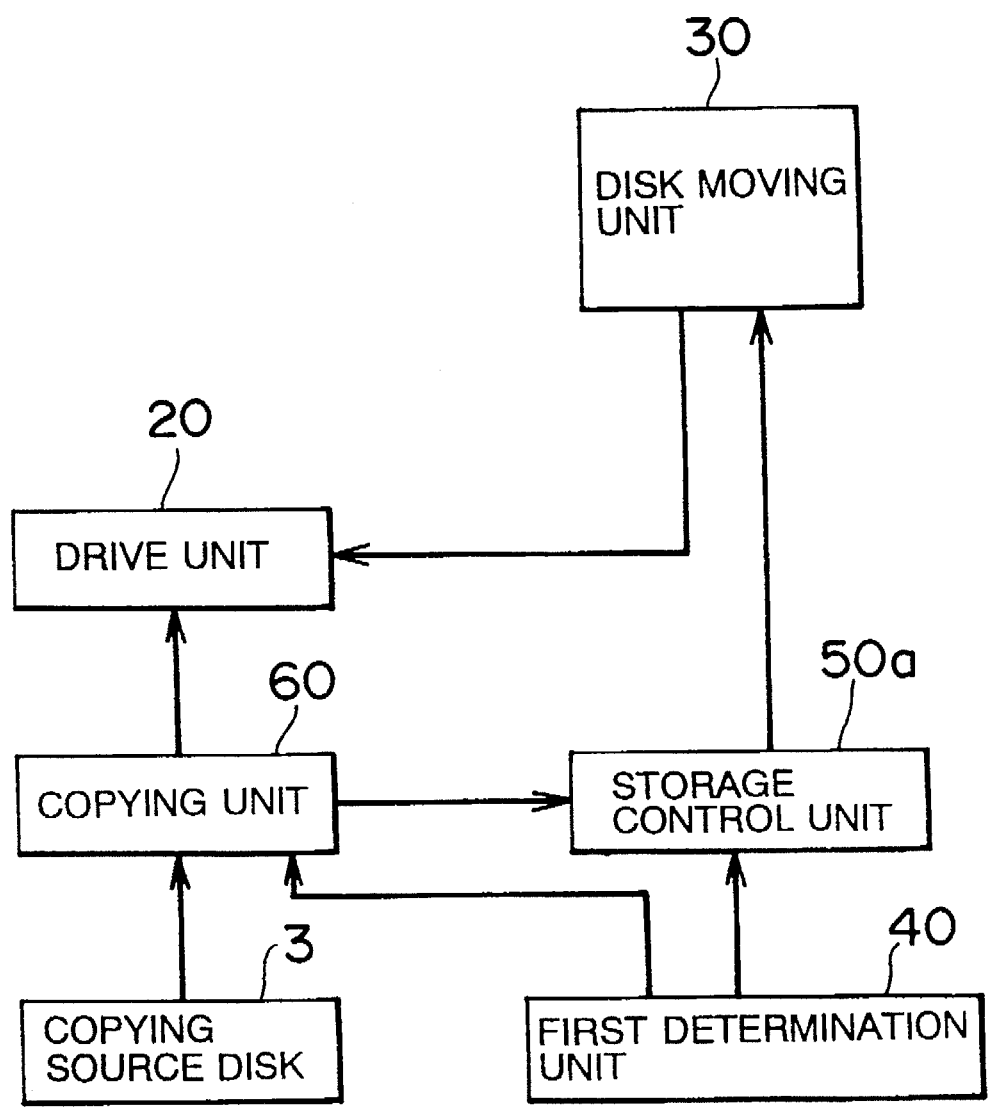
FIG. 18 is a construction diagram indicating a library device and peripheral devices of embodiment 5.
Figure 19:
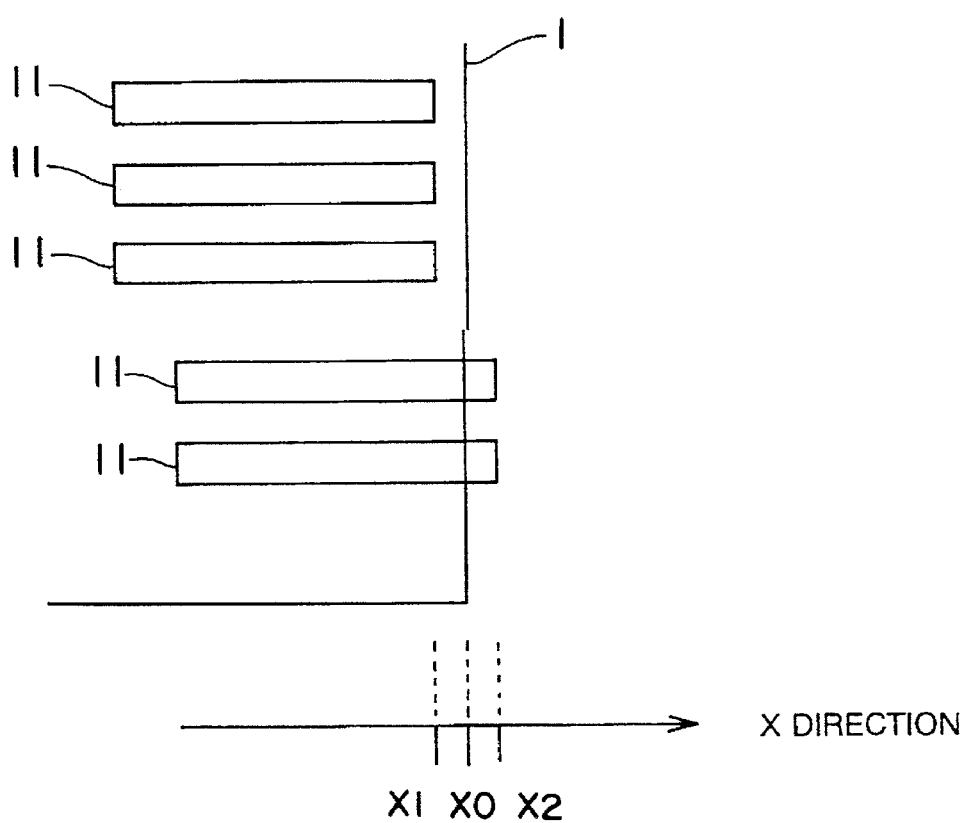
FIG. 19 is a diagram indicating disks stored by storage control unit of embodiment 5.

The embodiment 5 of the present invention will be described. The construction diagram of the library device of embodiment 5 is shown in FIG. 18. In FIG. 18, the construction of the storage control unit 50a of embodiment 5 is different from the construction of the storage control unit 50 of embodiment 2. The disks stored by the storage control unit 50a are shown in FIG. 19. Further, other constructions are the same as those of embodiment 2, so the description about the identical parts will be omitting, and like components will be indexed with the same numbers previously use.

As shown in FIG. 19, the storage control unit 50a controls coordinate values in the X direction (depth direction) of the library device 1, and controls the disk moving unit 30 so that the disks 11 will be stored in a predetermined position $X_1$ of the storage rack when the copying process is normal.

The storage control unit 50a controls the disk moving unit 30 so that the disks will be stored in a position $X_2$, for instance, which is shifted about 1 cm outside from a position $X_0$ ( an end face position of the device) when the copying process is not normal.

As mentioned hereinbefore, the error disks can be easily grasped by shifting the position of the error disks.

What is claimed is:

1. A library apparatus for copying information from a copying source disk to a plurality of disks, said library apparatus, comprising:

a plurality of storage racks for storing a plurality of disks into which information stored on said copying source disk may be copied;

first determination means for determining whether or not the number of storage racks exceeds the number of disks;

copying means for copying the information stored in said copying source disk into each of the disks in order and for determining whether or not a copying process is normal, said copying means operating after it is determined by said first determination means that the number of storage racks exceeds the number of disks;

an accessor for transferring the disks from said copying means to one of said storage racks; and storage control means for controlling the movement of said accessor so as to store the disks on one side of the storage racks in order when the copying process performed by said copying means is normal, and for controlling the movement of said accessor so as to store the disks on another side of the storage racks in order when the copying process is not normal.

2. A library apparatus according to claim 1, wherein the number of storage racks is one more than the number of the disks.

3. A library apparatus according to claim 1, further comprising:

drive means for driving each of the disks, the copying source disks and said copying means; and disk moving means for moving each of the disks in order to said drive means when each of the disks is copied, and for moving each of the disks to the edge appropriate side of the storage racks as directed by a control signal indicating either normality or abnormality of the copying process, after said control signal is outputted from said storage control means after each of the disks has been copied.

4. A library apparatus according to claim 1, wherein said storage control means controls the disks so as to take out a disk from said one side of the storage racks as the next disk to be copied and processed when the copying process is normal, and controls the disks so as to take out disk from said another side of the storage racks as the next disk to be copied when the copying process is not normal.

5. A library apparatus according to claim 1, further comprising:

counting means for counting a total number of copied disks and the number of error disks in which the copying processes are not normal;

second determination means for determining whether or not the number of error disks counted by said counting means has exceeded a predetermined number; and alarm means for sounding an alarm when the number of error disks has exceeded the predetermined number.

6. A library apparatus according to claim 5, wherein the predetermined number of error disks is half of the total number of copied disks.

7. A library apparatus according to claim 1, further including:

display means for displaying on a screen the number of error disks in which the copying process is not normal.

8. A library apparatus according to claim 7, wherein said display means displays on the screen a plurality of storage rack positions corresponding to the number of storage racks, and after copying has been completed, said display means also displays a vacant storage rack indicator in one of said storage rack positions corresponding to a vacant storage rack such that the storage rack positions on one side of said vacant storage rack indicator represent the normal disks and the storage rack positions on the other side of said vacant storage rack indicator represent the error disks.

9. A library apparatus according to claim 1, wherein said storage control means controls the disks so as to store the disks in a predetermined position of the storage racks when the copying process is normal, and controls the disks so as to store the disks in a position that is linearly shifted from the predetermined position when the copying process is not normal.

10. A method for using a library apparatus with a plurality of storage racks for copying information from a copying source disk to a plurality of disks, said method comprising:

determination step for determining whether or not the number of storage racks exceeds the number of disks into which information stored in the copying source disk are to be copied;

copying step for copying the information stored in the copying source disk into each of the disks in order and determining whether or not the copying process is normal, said copying step being performed after it has been determined that the number of storage racks exceeds the number of disks; and storage control step for controlling the disks so as to store the disks from one side of the storage racks in order when the copying process is normal, and for controlling the disks so as to store the disks from another side of the storage racks in order when the copying process is not normal.

11. A method according to claim 10, wherein the number of storage racks is one more than the number of disks.

12. A method according to claim 10, further comprising:

a drive step for driving each of the disks, the copying source disks and a copying unit by a drive unit; and a disk moving step for moving each of the disks to said drive unit in order when each of the disks is copied, and moving each of the disks to the appropriate side of the storage racks as directed by the control signal indicating either normality or abnormality of the copying process, which is determined after each of the disks has been copied.

13. A method according to claim 10, wherein said storage control step controls the disks so as to take out the disks from said one side of the storage racks as a next disk to be copied and processed when the copying process is normal, and controls the disks so as to take out the disks from said another side of the storage racks as a next disk to be copied when the copying process is not normal.

14. A method according to claim 10, further comprising:

a counting step for counting a total number of copied disks and the number of error disks in which the copying process is not normal;

a determination step for determining whether or not the number of counted error disks has exceeded a predetermined number; and an alarm step for sounding an alarm when the number of error disks has exceeded a predetermined number.

15. A method according to claim 14, wherein the predetermined number of error disks is half of the total number of the copied disks.

16. A method according to claim 10, further including:

a display step for displaying on a screen the number of error disks in which the copying process is not normal.

17. A method according to claim 16, wherein said display step displays on the screen a plurality of storage rack positions corresponding to the number of storage racks, and after the copying step has been completed, said display step also displays a vacant storage rack indicator in one of said storage rack positions corresponding to a vacant storage rack such that the storage rack positions on one side of said vacant storage rack indicator represent the normal disks and the storage rack positions on the other side of said vacant storage rack indicator represent the error disks.

18. A method according to claim 10, wherein said storage control step controls the disks so as to store the disks in a predetermined position of the storage racks when the copying process is normal, and controls the disks so as to store the disks in a position that is linearly shifted from the predetermined position of the storage racks when the copying process is not normal.

19. A method for producing a duplicated disk, comprising the steps of:

providing a library apparatus including a plurality of storage cells, each of said cells for storing a recordable medium, a reproducing unit which reproduces master information stored in a master disk, a writing unit which writes said master information into said recordable medium, and an accessor which moves said recordable medium between said storage cells and said writing unit;

inserting said master disk into said reproduction unit;

a first transfer step in which said accessor transfers one of said recordable mediums to said reproducing unit;

a duplicating step in which said master information is duplicated onto one of said recordable mediums by said reproducing unit;

a second transfer step in which said accessor transfers the recordable medium upon which said master information has been recorded from said reproducing unit to a vacant cell in said library apparatus, and controlling, by a controller, the accessor and the reproducing unit such that said first transfer step, said duplicating step, and said second transfer step are repeated until the number of recordable mediums containing said master information reaches a preselected number, wherein said preselected number is one less than the number of cells.

20. A library apparatus for copying information from a copying source disk to a plurality of recordable mediums, said library apparatus comprising:

a plurality of cells in a cell unit provided in a housing of said library apparatus, each of said cells being capable of holding one of said recordable mediums therein;

a copying unit provided within said housing, said copying unit for reproducing master information from said copying source disk and for recording said master information onto each of the recordable mediums;

a transfer mechanism provided within said housing, said transfer mechanism for transferring the recordable medium to said copying unit, where said master information is recorded thereon, and then for transferring the recordable medium to a vacant one of said cells in said cell unit; and a controller for controlling a transfer process whereby said transferring mechanism and said copying unit are controlled such that each of the recordable mediums is transferred, one by one, from said cell unit to said copying unit, whereupon said master information is recorded on the recordable medium, whereby the recordable medium is then transferred to a vacant cell in said cell unit, and where said transfer process is repeated until the number of recordable mediums transferred reaches a preselected number, wherein said preselected number is one less than the number of cells.

21. A library apparatus according to claim 20 wherein, said copying unit is also configured and arranged for determining if a copy of said master information on a recordable medium is normal or not normal; and said controller is also configured and arranged for controlling said transfer process such that a recordable medium designated as normal is transferred to one side of said cell unit and a recordable medium designated as not normal is transferred to another side of said cell unit, whereby upon completion of said transfer process, recordable mediums designated as normal will be separated from recordable mediums designated as not normal by a vacant cell.

22. A library apparatus according to claim 21 further comprising a display means for displaying on a screen the number of recordable mediums designated as not normal.

23. A library apparatus according to claim 22, wherein
said display means displays a plurality of cell positions corresponding to the number of cells in said cell unit, and after the transfer process has been completed, said display means also displays a vacant cell indicator in one of said cell positions corresponding to a vacant cell such that the cell positions on one side of said vacant cell indicator represent the recordable mediums designated as normal and the cell positions on another side of said vacant cell indicator represent the recordable mediums designated as not normal.

24. A library apparatus according to claim 20, wherein
said copying unit includes a reproducing device for reproducing said master information and a recording device which is operatively connected to said reproducing device, said recording device for recording the reproduced master information onto said recordable mediums.

* * * * *

UNITED STATES PATENT AND TRADEMARK OFFICE
CERTIFICATE OF CORRECTION

PATENT NO. : 5,640,535
DATED : June 17, 1997
INVENTOR(S) : Suzuki et al.

It is certified that error appears in the above-identified patent and that said Letters Patent is hereby corrected as shown below:

Column 2, line 47, delete "the" (second occurrence).

Column 4, line 5, after "of" insert --:-- (a colon).

Column 4, line 13, delete "being recordable".

Column 4, line 42, delete "disk" and insert --disks-- and delete "disks" (2nd occurrence) and insert --disk-- therefor.

Column 5, line 29, delete "an".

Column 6, line 31, delete "the" (second occurrence).

Column 6, line 61, delete "plurality of".

UNITED STATES PATENT AND TRADEMARK OFFICE
CERTIFICATE OF CORRECTION

PATENT NO. : 5,640,535
DATED : June 17, 1997
INVENTOR(S) : Suzuki et al.

It is certified that error appears in the above-identified patent and that said Letters Patent is hereby corrected as shown below:

Column 7, line 25, delete "a".

Column 7, line 50, delete "Besides, in" and insert -- In-- therefor.

Column 8, line 16, after "computer" insert --2-- therefor.

Column 8, line 29, delete "the" (second and third occurrences).

Column 8, line 55, delete "and".

Column 14, line 14, delete "will be".

UNITED STATES PATENT AND TRADEMARK OFFICE
CERTIFICATE OF CORRECTION

PATENT NO. : 5,640,535
DATED      : June 17, 1997
INVENTOR(S) : Suzuki et al.

It is certified that error appears in the above-identified patent and that said Letters Patent is hereby corrected as shown below:

Column 15, line 48, delete "use" and insert --used-- therefor.

Column 16, line 28, delete "edge".

Column 16, line 40, after "out" insert --a--.

Signed and Sealed this

Thirteenth Day of October 1998

Attest:

BRUCE LEHMAN

Attesting Officer

Commissioner of Patents and Trademarks